US009228249B2

(12) United States Patent
Watanabe et al.

(10) Patent No.: US 9,228,249 B2
(45) Date of Patent: Jan. 5, 2016

(54) SI ALLOY NEGATIVE ELECTRODE ACTIVE MATERIAL FOR ELECTRIC DEVICE

(75) Inventors: Manabu Watanabe, Yokosuka (JP); Osamu Tanaka, Yokosuka (JP); Takashi Miyamoto, Higashiyamato (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 247 days.

(21) Appl. No.: 13/394,977

(22) PCT Filed: Nov. 26, 2010

(86) PCT No.: PCT/JP2010/071169

§ 371 (c)(1), (2), (4) Date: Mar. 8, 2012

(87) PCT Pub. No.: WO2011/065504

PCT Pub. Date: Jun. 3, 2011

(65) Prior Publication Data

US 2012/0175551 A1 Jul. 12, 2012

(30) Foreign Application Priority Data

Nov. 27, 2009 (JP) ................................ 2009-270345

(51) Int. Cl.

| | |
|---|---|
| ***H01M 4/134*** | (2010.01) |
| ***C22C 18/00*** | (2006.01) |
| ***C22C 21/02*** | (2006.01) |
| ***C22C 21/10*** | (2006.01) |
| ***C22C 30/06*** | (2006.01) |

(Continued)

(52) U.S. Cl.

CPC ................ *C22C 18/00* (2013.01); *C22C 21/02* (2013.01); *C22C 21/10* (2013.01); *C22C 30/06* (2013.01); *H01M 4/386* (2013.01); *H01M 4/42* (2013.01); *H01M 4/463* (2013.01); *H01M 4/0426* (2013.01); *H01M 4/134* (2013.01); *H01M 4/1395* (2013.01); *Y02E 60/12* (2013.01)

USPC ..... 429/218.1; 429/229; 429/245; 252/182.1; 252/521.3; 252/519.5; 252/519.54; 252/519.51

(58) Field of Classification Search

USPC ................................ 252/519.5, 519.54, 500

See application file for complete search history.

(56) References Cited

U.S. PATENT DOCUMENTS 6,113,667 A 9/2000 Hyogo et al.
2006/0040182 A1 2/2006 Kawakami et al.

(Continued)

FOREIGN PATENT DOCUMENTS

CN 1211484 A 3/1999
JP 60-89069 A 5/1985

(Continued)

OTHER PUBLICATIONS

Fleischauer, M.D. et al., "Al—Si Thin-Film Negative Electrodes for Li-Ion Batteries", *Journal of the Electrochemical Society*, vol. 155, No. 11, pp. A851-A854 (2008).

(Continued)

*Primary Examiner* — Harold Pyon
*Assistant Examiner* — Katie L Hammer
(74) *Attorney, Agent, or Firm* — Foley & Lardner LLP

(57) ABSTRACT

A negative electrode active material for an electric device, including an alloy having a composition formula $Si_xZn_yAl_z$, where x++y=100 , 26≤x≤47, 18≤y≤44, and 22≤z≤46 are satisfied.

3 Claims, 7 Drawing Sheets

(51) Int. Cl.

| | |
|---|---|
| ***H01M 4/38*** | (2006.01) |
| ***H01M 4/42*** | (2006.01) |
| ***H01M 4/46*** | (2006.01) |
| *H01M 4/04* | (2006.01) |
| *H01M 4/1395* | (2010.01) |

(56) References Cited

U.S. PATENT DOCUMENTS

2006/0115735 A1 6/2006 Yasuda et al.
2007/0128517 A1 6/2007 Christensen et al.
2008/0206651 A1 * 8/2008 Kawase et al. ................ 429/330
2009/0061322 A1 3/2009 Kawakami et al.
2010/0167126 A1 7/2010 Christensen et al.

FOREIGN PATENT DOCUMENTS

JP 2003-208893 A 7/2003
JP 2004-311429 A 11/2004
JP 2009-517850 A 4/2009
RU 2303318 C2 7/2007

OTHER PUBLICATIONS

U.S. Appl. No. 13/393,048, filed Feb. 28, 2012, Watanabe et al.
Chinese Office Action, Jul. 31, 2014, 10 pages.

* cited by examiner

SI ALLOY NEGATIVE ELECTRODE ACTIVE MATERIAL FOR ELECTRIC DEVICE

TECHNICAL FIELD

The present invention relates to a Si alloy negative electrode active material for electric device and an electric device using the Si alloy negative electrode active material for electric device. The Si alloy negative electrode active material for electric device and the electric device using the same of the present invention are usable as a secondary battery, a capacitor, or the like for a driving power source or an auxiliary power source of a motor of a vehicle such as an electric vehicle, a fuel cell vehicle, and a hybrid electric vehicle.

BACKGROUND ART

In recent years, in order to address atmospheric pollution and global warming, there has been a strong demand for reduction of a carbon dioxide amount. In the automobile industry, there are high expectations that the reduction of carbon dioxide amount can be attained by introduction of an electric vehicle (EV) and a hybrid electric vehicle (HEV), and an electric device such as a secondary battery for driving a motor, which is the key to the practical realization of these vehicles, has actively been developed.

The motor-driving secondary battery is required to have a considerably high output property and high energy as compared to a consumer lithium ion secondary battery used in a mobile phone or a laptop personal computer. Therefore, a lithium ion secondary battery having the highest theoretical energy among all types of batteries has attracted attention and is being rapidly developed at present.

The lithium ion secondary battery generally has a structure in which a positive electrode obtained by coating a positive electrode active material and the like on both surfaces of a positive electrode current collector by using a binder and a negative electrode obtained by coating a negative electrode active material and the like on both surfaces of a negative electrode current collector by using a binder are connected to each other via an electrolyte layer and housed in a battery casing.

A carbon/graphite material which is advantageous in charge-discharge cycle life and cost has heretofore been used for the negative electrode of the lithium ion secondary battery. However, since the charge-discharge is performed by occlusion/release of lithium ions into/from a graphite crystal with the carbon/graphite negative electrode material, there is a drawback that it is difficult to attain a charge-discharge capacity of 372 mAh/g or more which is the theoretical capacity obtainable from $LiC_6$ which is the largest-amount-lithium intercalation compound. Therefore, it is difficult to attain capacity and energy density which are satisfactory for the practical use in vehicles with the use of the carbon/graphite negative electrode material.

On the other hand, since a battery in which a material to be alloyed with Li is used for a negative electrode is expected as a negative electrode material for use in vehicles since the battery is improved in energy density as compared to the conventional carbon/graphite negative electrode material. For example, one mole of a Si material occludes and releases 4.4 mol of lithium ions as shown in a reaction formula (I), and a theoretical capacity of $Li_{22}Si_5$ (=$Li_{4.4}Si$) is 2100 mAh/g. Further, in the case of calculation per weight of Si, an initial capacity of 3200 mAh/g (see Sample 10 of Example 1) is attained.

[Formula 1]

$$Si+4.4Li^{+}+e^{-} \leftrightarrow Li_{4.4}Si \quad (1)$$

However, in the lithium ion secondary battery using the material alloyed with Li for the negative electrode, expansion-shrinkage in charge-discharge is large in the negative electrode. For example, a volumetric expansion of a graphite material in the case of occluding Li ions is about 1.2 times, while the Si material has a problem of reducing a cycle life of an electrode due to a large volumetric change (about 4 times) which is caused by transition from an amorphous state to a crystal state in the alloying between Si and Li. Also, since a capacity and cycle durability have a trade-off relationship in the case of the Si negative electrode active material, there has been a problem that it is difficult to improve high cycle durability while maintaining a high capacity.

In order to solve the problems, a negative electrode active material for lithium ion secondary battery, which contains an amorphous alloy having a formula of $Si_xM_yAl_z$, has been proposed (see Patent Document 1, for example). In the formula, each of x, y, and z represents an atomic percent, x+y+z=100, x≥55, y<22, z>0, and M is a metal formed of at least one of Mn, Mo, Nb, W, Ta, Fe, Cu, Ti, V, Cr, Ni, Co, Zr, and Y. In the invention disclosed in Patent Document 1, there is the description in the paragraph [0018] that good cycle life is exhibited in addition to a high capacity by minimizing the content of the metal M.

PRIOR ART DOCUMENTS

Patent Document

Patent Document 1: JP-T-2009-517850

SUMMARY OF THE INVENTION

Problems to be Solved by the Invention

However, in the case of the lithium ion secondary battery using the negative electrode having the amorphous alloy having the formula: $Si_xM_yAl_z$ disclosed in Patent Document 1, the initial capacity is not satisfactory though it is described that the good cycle property is exhibited. Also, the cycle property is not satisfactory.

Accordingly, an object of the present invention is to provide a negative electrode active material for an electric device (sometimes simply referred to as negative electrode active material) such as a Li ion secondary battery, which exhibits a well-balanced property of maintaining a high cycle property and attaining a high initial capacity.

Means for Solving the Problems

The inventors found that it is possible to solve the above problems by adopting an alloy of which a Si—Zn—Al composition ratio is included in a specific composition range among ternary Si—Zn—Al alloys and accomplished the present invention based on the findings.

More specifically, it is possible to attain the object of the present invention by a negative electrode active material for electric device containing an alloy having a composition formula of $Si_xZn_yAl_z$. In the composition formula $Si_xZn_yAl_z$, each of x, y, and z represents a mass percent value, satisfying (1) x+y+z=100, (2) 21≤x<100, (3) 0<y<79, and (4) 0<z<79.

Effect of the Invention

According to a negative electrode active material for electric device of the present invention, an effect of suppressing amorphous-crystal phase transition and improving a cycle life is attained when an alloy having the above-specified composition formula contains a first additive element Zn within the above-specified range when Si and Li are alloyed with each other. Further, in the case of alloying Si and Li with each other, an effect that a capacity of an electrode is not reduced even though a concentration of the first additive element is increased is attained when the alloy having the above-specified composition formula contains a second additive element Al within the above-specified range. As a result of these combined effects, the negative electrode active material containing the alloy having the above composition formula obtains advantageous effects such as high initial capacity and high capacity/high cycle durability.

MODE FOR CARRYING OUT THE INVENTION

Figure 1:
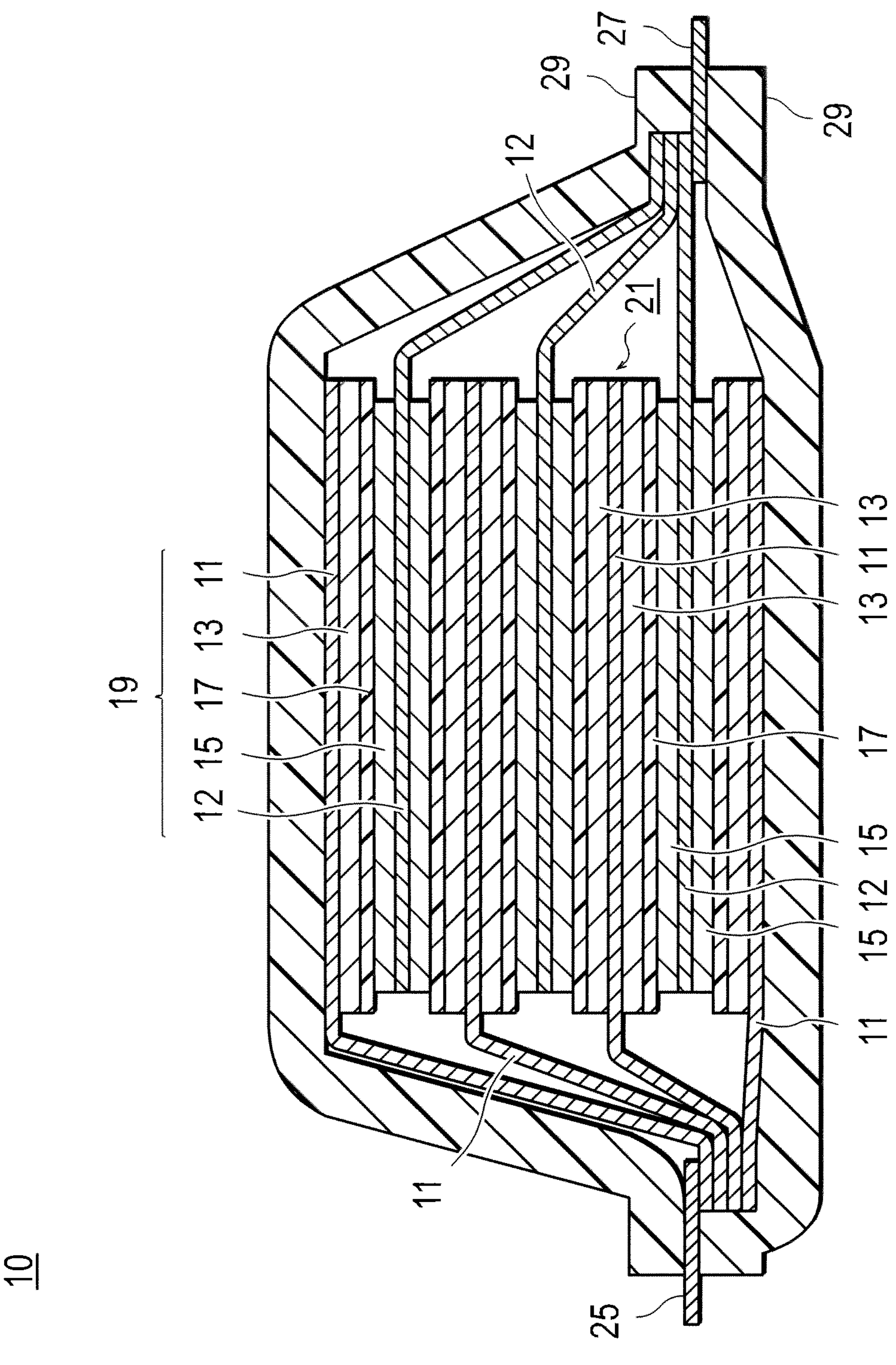
FIG. 1 is a sectional view schematically showing an outline of a laminated flat non-bipolar lithium ion secondary battery which is one typical embodiment of an electric device according to the present invention.

Hereinafter, embodiments of a negative electrode active material for electric device and an electric device using the same of the present invention will be described with reference to the drawings. The technical scope of the present invention should be defined based on the appended claims and is not limited to the modes described below. In the description of the drawings, the same elements are denoted with the same reference numerals, and the description thereof is not repeated. The dimensional ratio in the drawings is exaggerated for the purpose of illustration and is sometimes different from an actual ratio.

Hereinafter, a basic configuration of the electric device to which the negative electrode active material for electric device of the present invention can be applied will be described by using the drawings. In the present embodiment, a lithium ion secondary battery is exemplified as the electric device.

In a negative electrode active material for lithium ion secondary battery, which is one typical embodiment of the negative electrode active material for electric device according to the present invention as well as a negative electrode and a lithium ion secondary battery using the same, a voltage of a cell (single cell layer) is large and, therefore, high energy density and high output density can be attained. Thus, the negative electrode and the lithium ion secondary battery using the negative electrode active material for lithium ion secondary battery of the present embodiment are excellent for use in a driving power source and an auxiliary power source for vehicles and, as a result, are favorably used for a lithium ion secondary battery for the driving power source and the like of vehicles. Further, the negative electrode and the lithium ion secondary battery are satisfactorily usable for a lithium ion secondary battery for mobile appliances such as a mobile phone.

In short, as the lithium ion secondary battery as an object of the present embodiment, those obtained by using the negative electrode active material for lithium ion secondary battery of the present embodiment described below are included, and other constituent features are not particularly limited.

For example, in the case where the lithium ion secondary batteries are distinguished from one another according to shape and structure, it is possible to adopt the lithium ion secondary batteries to the known shapes and structures such as a laminated (flat) battery and a wound (cylindrical) battery. The laminated (flat) battery structure makes it possible to ensure long term reliability by the simple sealing technology such as the thermocompression bonding and is advantageous in cost and workability.

In terms of an electric connection mode (electrode configuration) inside the lithium ion secondary battery, it is possible to adopt the lithium ion secondary battery to both of a non-bipolar (internal parallel connection type) battery and a bipolar (internal serial connection type) battery.

In the case of making distinction according to the type of an electrolyte layer in the lithium ion secondary battery, it is possible to adopt the lithium ion secondary battery to any known electrolyte layers such as a solution electrolyte battery in which a solution electrolyte such as a non-aqueous electrolyte liquid is used for the electrolyte layer and a polymer battery in which a polymer electrolyte is used for the electrolyte layer. The polymer battery is classified into a gel electrolyte battery using a polymer gel electrolyte (sometimes simply referred to as gel electrolyte) and a solid polymer (all solid state) battery using a polymer solid electrolyte (sometimes simply referred to as polymer electrolyte).

Therefore, in the following description, a non-bipolar (internal parallel connection type) lithium ion secondary battery using the negative electrode active material for lithium ion secondary battery of the present embodiment will be described quite briefly by using the drawings. The technical scope of the lithium ion secondary battery of the present embodiment is not limited to the following description.

<Entire Configuration of Battery>

FIG. 1 is a sectional view schematically showing an entire configuration of a flat type (laminated type) lithium ion secondary battery (hereinafter sometimes simply referred to as "laminated battery") which is one typical embodiment of the electric device of the present invention.

As shown in FIG. 1, a laminated battery 10 of the present embodiment has a configuration in which a substantially rectangular power generation element 21 in which a charge-discharge reaction actually progresses is sealed inside a laminated sheet 29 serving as a jacket member. The power generation element 21 has a configuration obtained by laminating a positive electrode in which a positive electrode active material layer 13 is disposed on each of sides of a positive electrode current collector 11, an electrolyte layer 17, and a negative electrode in which a negative electrode active material layer 15 is disposed on each of sides of a negative electrode current collector 12. More specifically, the negative electrode, the electrolyte layer, and the positive electrode are laminated in this order in such a manner that one of the positive electrode active material layers 13 and the adjacent negative electrode active material layer 15 are opposed via the electrolyte layer 17.

With this configuration, the positive electrode, the electrolyte layer, and the negative electrode which are adjacent to one another form a single cell layer 19. In other words, in the laminated battery 10 shown in FIG. 1, a plurality of the single cell layers 19 are laminated to attain the configuration in which the single cell layers 19 are electrically connected in parallel. The positive electrode active material layer 13 is disposed only on one side of each of the outermost positive electrode current collectors positioned at the outermost layers of the power generation element 21, but the active material layer may be provided on each of both sides. In short, the current collector having the active material layers on both sides may be used as the current collector at the outermost layer without limitation to the current collector dedicated to the outermost layer in which the active material layer is provided only on one side. Also, the negative electrode active material layer may be disposed on one or both sides of the negative electrode current collector of the outermost layer by positioning the negative electrode current collector of the outermost layer at each of the outermost layers of the power generation element 21 by reversing the positions of the positive electrode and the negative electrode shown in FIG. 1.

The positive electrode current collector 11 and the negative electrode current collector 12 have a configuration in which a positive electrode current collector plate 25 and a negative electrode current collector plate 27 which are electrically conductive to the electrodes (positive electrode and negative electrode) are attached to the current collectors 11, 12, and each of the current collector plates 25, 27 is sandwiched between ends of the laminated sheets 29 to be led out of the laminated sheets 29. The positive electrode current collector plate 25 and the negative electrode current collector plate 27 may be attached to the positive electrode current collector 11 and the negative electrode current collector 12 of the electrodes via a positive electrode lead and a negative electrode lead (not shown) as required by ultrasonic welding, resistance welding, or the like.

The above-described lithium ion secondary battery is characterized by its negative electrode active material composition.

Hereinafter, main constituent members of the battery including the negative electrode active material will be described.

(Active Material Layer)

The active material layer 13 or 15 contains an active material and other additives as required.

(Positive Electrode Active Material Layer)

The positive electrode active material layer 13 contains a positive electrode active material.

[Positive Electrode Active Material]

Examples of the positive electrode active material include a lithium-transition metal composite oxide, a lithium-transition metal phosphate compound, a lithium-transition metal sulfate compound, a solid solution system, a ternary system, a NiMn system, a NiCo system, and a spinel Mn system. Examples of the lithium-transition metal composite oxide include $LiMn_2O_4$, $LiCoO_2$, $LiNiO_2$, Li (Ni, Mn, Co) $O_2$, Li (Li, Ni, Mn, Co) $O_2$, $LiFePO_4$, and those obtained by partially substituting each of these transition metals with another element. Examples of the solid solution system include $xLiMO_2 \cdot (1-x) Li_2NO_3$ ($0<x<1$, M is one or more kinds of transition metals in which an average oxidation state is 3+, and N is one or more kinds of transition metals in which an average oxidation state is 4+), and $LiRO_2$—$LiMn_2O_4$ (R is a transition metal element such as Ni, Mn, Co, or Fe). Examples of the ternary system include a nickel-cobalt-manganese system (composite) positive electrode material. Examples of the spinel Mn system include $LiMn_2O_4$. Examples of the NiMn system include $LiNi_{0.5}Mn_{1.5}O_4$. Examples of the NiCo system include $Li(NiCo)O_2$. In some cases, two or more kinds of the positive electrode active materials may be used in combination. Preferably, the lithium-transition metal composite oxide is used as the positive electrode active material from the viewpoints of capacity and output property. Of course, positive electrode active materials other than those described above may be used. In the case where optimum particle diameters for exhibiting specific effects of the active materials are different from each other, particles having the optimum particle diameters for exhibiting the specific effects may be blended, and it is not always necessary to uniformize the particle diameters of all of the active materials.

An average particle diameter of the positive electrode active material to be contained in the positive electrode active material layer 13 may preferably be, but is not particularly limited to, 1 to 20 μm, from the viewpoint of attainment of high output. In the present specification, the term "particle diameter" means a longest distance among distances between arbitrary two points on an outline of an active material particle (observed surface) observed by using an observation means such as a scanning electron microscope (SEM) and a transmission electron microscope (TEM). As a value of the "average particle diameter", a value which is calculated as an average value of particle diameters of particles observed in several to several tens of viewing fields by using an observation means such as a scanning electronmicroscope (SEM) and a transmission electronmicroscope (TEM) is used. A particle diameter and an average particle diameter of each of other constituent components are defined in the same manner.

The positive electrode (positive electrode active material layer) may be formed by a method of applying (coating) an ordinary slurry or any one of methods of kneading, sputtering, vapor deposition, CVD, PVD, ion plating, and thermal spraying.

(Negative Electrode Active Material Layer)

The negative electrode active material layer 15 has a negative electrode active material containing an alloy having a composition formula of $Si_xZn_yAl_z$ of the present embodiment. A favorable negative electrode for lithium ion secondary battery having high capacity and high cycle durability is obtained by using the negative electrode active material of the present embodiment. Also, by using the negative electrode for lithium ion secondary battery obtained by using the negative electrode active material of the present embodiment, a lithium ion secondary battery having favorable battery properties of high capacity and excellent cycle durability is obtained.

[Negative Electrode Active Material]

Figure 5:
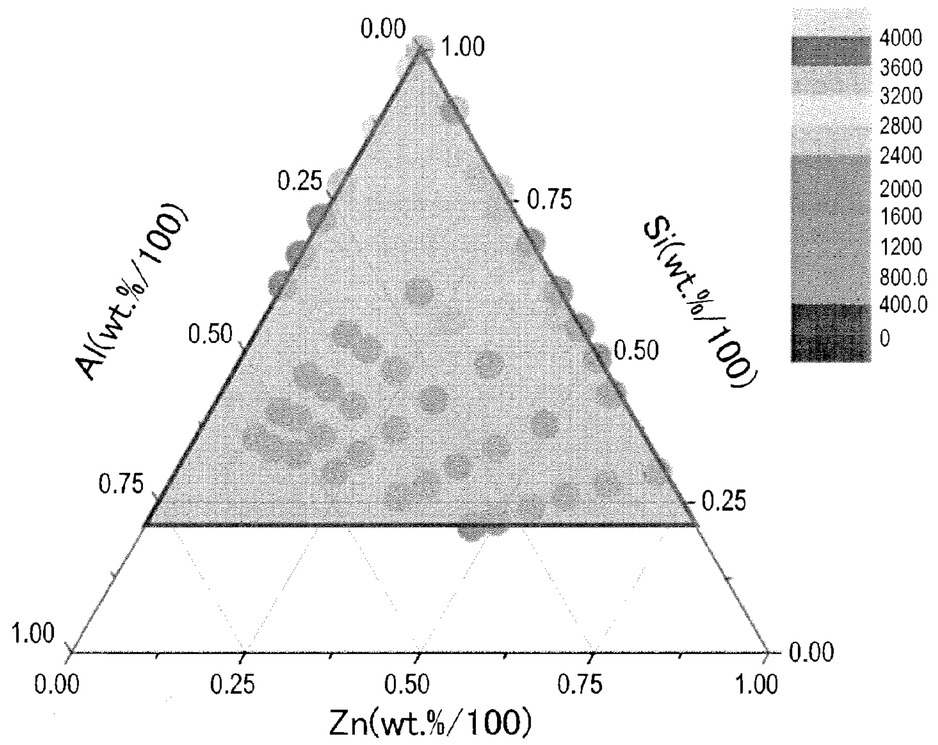
FIG. 5 is a diagram in which composition ranges of the Si—Zn—Al alloy samples of Example 1 are enclosed and color-coded (shaded) on the diagram of the compositions of the Si—Zn—Al ternary alloys of FIG. 3, wherein Si+Zn+Al (unit of each of the elements is wt %/100)=1.00, (2) 0.21≤Si (wt %/100)<1.00, (3) 0<Zn (wt %/100)<0.79, and (4) 0<Al (wt %/100)<0.79.

The present embodiment is characterized by containing an alloy having the composition formula $Si_xZn_yAl_z$ as the negative electrode active material. In the composition formula $Si_xZn_yAl_z$, each of x, y, and z represents a mass percent value, satisfying (1) $x+y+z=100$, (2) $21\leq x<100$, (3) $0<y<79$, and (4) $0<z<79$. In the present embodiment, a first additive element Zn which improves a cycle life by suppressing amorphous-crystal phase transition when alloying Li and a second additive element Al which does not cause a reduction of capacity as the electrode even though a concentration of the first additive element is increased are selected, and an appropriate composition ratio between the additive elements and high capacity element Si is maintained. In the alloying of Li, the amorphous-crystal phase transition should be suppressed since the function as the active material can be lost by breakage of the particles per se due to a large volumetric change (to about 4 times of volume) which is caused by the transition from an amorphous state to a crystal state when Si and Li are alloyed in the Si material. Therefore, it is possible to maintain the function (high capacity) as the active material and to improve the cycle life by suppressing the disruption of particles through the suppression of amorphous-crystal phase transition. By selecting the first and second additive elements and maintaining the appropriate composition ratio between the additive elements and the high capacity element Si, it is possible to provide a Si alloy negative electrode active material having high capacity and high cycle durability. More specifically, in the case where the composition ratio of the Si—Zn—Al alloy is within the range enclosed by the thick line (inside the triangle) in FIG. 5, it is possible to realize a significantly high capacity which is hardly realized by existing carbon-based negative electrode active materials. Likewise, it is possible to realize a high capacity (initial capacity of 824 mAh/g or more) which is higher than those of existing Sn-based alloy negative electrode active materials. Further, as to the cycle durability which has the trade-off relationship with the high capacity, it is possible to realize significantly excellent cycle durability as compared to the Sn-based negative electrode active materials having high capacity and poor cycle durability and the multi-element alloy negative electrode active materials disclosed in Patent Document 1. Particularly, it is possible to realize a high discharge capacity maintenance ratio at 50th cycle. Thus, it is possible to provide the excellent Si alloy negative electrode active material.

The negative electrode active material of the present embodiment may preferably be characterized in that (1) $x+y+z=100$, (2) $26\leq x\leq 78$, (3) $16\leq y\leq 69$, and (4) $0<z\leq 51$ are satisfied in the composition formula $Si_xZn_yAl_z$. In the case where a composition ratio among Zn which is the first additive element, Al which is the second additive element, and the high capacity element Si is within the above-specified appropriate range, it is possible to provide a Si alloy negative electrode active material having favorable properties. More specifically, in the case where the composition ratio of the Si—Zn—Al alloy is within the range enclosed by the thick line in FIG. 6 (inside the hexagon of FIG. 6), it is possible to realize a significantly high capacity which is hardly realized by the existing carbon-based negative electrode active materials. Likewise, it is possible to realize a higher capacity (initial capacity of 824 mAh/g or more) as compared to the existing Sn-based alloy negative electrode active materials. Further, as to the cycle durability which has the trade-off relationship with the high capacity, it is possible to realize significantly excellent high cycle durability as compared to the Sn-based negative electrode active materials having high capacity and poor cycle durability and the multi-element alloy negative electrode active materials disclosed in Patent Document 1. In short, in this case, composition ranges which enabled to realize the significantly excellent cycle durability as compared to the Sn-based negative electrode active materials and the multi-element alloy negative electrode active materials disclosed in Patent Document 1 are selected among composition ranges which actually enabled to realize the high capacities in Samples 1 to 35 of Example 1. More specifically, the composition ranges which enables to realize the high discharge capacity maintenance ratio of 85% or more at 50th cycle are selected (the hexagon enclosed by the thick line in FIG. 6), and, therefore, it is possible to provide the excellent Si alloy negative electrode active material having well-balanced high capacity and cycle durability (see Table 1 and FIG. 6).

The negative electrode active material of the present embodiment may more preferably be characterized in that (1) $x+y+z=100$, (2) $26\leq x\leq 66$, (3) $16\leq y\leq 69$, and (4) $2\leq z\leq 51$ are satisfied in the composition formula $Si_xZn_yAl_z$. In the present embodiment, in the case where a composition ratio among Zn which is the first additive element, Al which is the second additive element, and the high capacity element Si is within the above-specified appropriate range, it is possible to provide a Si alloy negative electrode active material having considerably favorable properties. More specifically, in the case where the composition ratio of the Si—Zn—Al alloy is within the range enclosed by the thick line in FIG. 7 (inside the small hexagon), it is possible to realize a significantly high capacity which is hardly realized by the existing carbon-based negative electrode active materials. Likewise, it is possible to realize a higher capacity (initial capacity of 1072 mAh/g or more) as compared to the existing Sn-based alloy negative electrode active materials. Further, as to the cycle durability which has the trade-off relationship with the high capacity, it is possible to provide the Si alloy negative electrode active material which realizes significantly excellent high cycle durability as compared to the Sn-based negative electrode active materials having high capacity and poor cycle durability and the multi-element alloy negative electrode active materials disclosed in Patent Document 1. More specifically, it is possible to realize a high discharge capacity maintenance ratio of 90% or more at 50th cycle. Particularly, in this case, composition ranges which actually enabled to realize the considerably well-balanced high capacities and high cycle durabilities are selected among Samples 1 to 35 of Example 1 (the hexagon enclosed by the thick line in FIG. 7). Thus, it is possible to provide the high-performance Si alloy negative electrode active material (see Table 1 and FIG. 7).

The negative electrode active material of the present embodiment may particularly preferably be characterized in that (1) $x+y+z=100$, (2) $26 \leq x \leq 47$, (3) $18 \leq y \leq 44$, and (4) $22 \leq z \leq 46$ are satisfied in the composition formula $Si_xZn_yAl_z$. In the present embodiment, in the case where a composition ratio among Zn which is the first additive element, Al which is the second additive element, and the high capacity element Si is within the above-specified appropriate range, it is possible to provide a Si alloy negative electrode active material having the most favorable properties. More specifically, in the case where the composition ratio of the Si—Zn-Aln alloy is within the range enclosed by the thick line in FIG. 8 (inside the smallest hexagon), it is possible to realize a significantly high capacity which is hardly realized by the existing carbon-based negative electrode active materials. Likewise, it is possible to realize a higher capacity (initial capacity of 1072 mAh/g or more) as compared to the existing Sn-based alloy negative electrode active materials. Further, as to the cycle durability which has the trade-off relationship with the high capacity, it is possible to provide the Si alloy negative electrode active material which realizes significantly excellent high cycle durability as compared to the Sn-based negative electrode active materials having high capacity and poor cycle durability and the multi-element alloy negative electrode active materials disclosed in Patent Document 1. More specifically, it is possible to realize a higher discharge capacity maintenance ratio of 95% or more at 50th cycle. In short, in this case, the composition range which actually enabled to realize the most well-balanced high capacity and high cycle durability (best mode) is selected from Samples 1 to 35 of Example 1 (the smallest hexagon enclosed by the thick line in FIG. 8). Thus, it is possible to provide the remarkably high-performance Si alloy negative electrode active material (see Table 1 and FIG. 8). In contrast, it is difficult for a binary alloy (Si—Al alloy in which y=0 or Si—Zn alloy in which z=0) which does not contain either one of the metal elements (Zn and Al) added to Si in the ternary alloy represented by $Si_xZn_yAl_z$ or an elemental substance of Si to maintain a high cycle property, particularly, a high discharge capacity maintenance ratio at 50th cycle. Accordingly, the cycle property is reduced (deteriorated) to make it difficult to realize the most well-balanced high capacity and high cycle durability.

Figure 2:
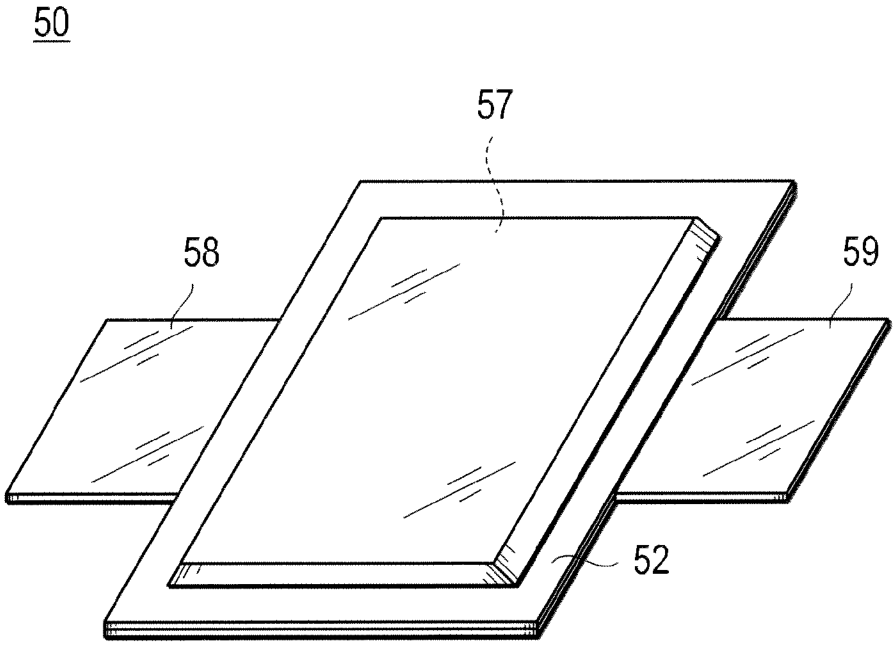
FIG. 2 is a perspective view schematically showing an appearance of the flat laminated lithium ion secondary battery which is the typical embodiment of the electric device according to the present invention.
Figure 4:
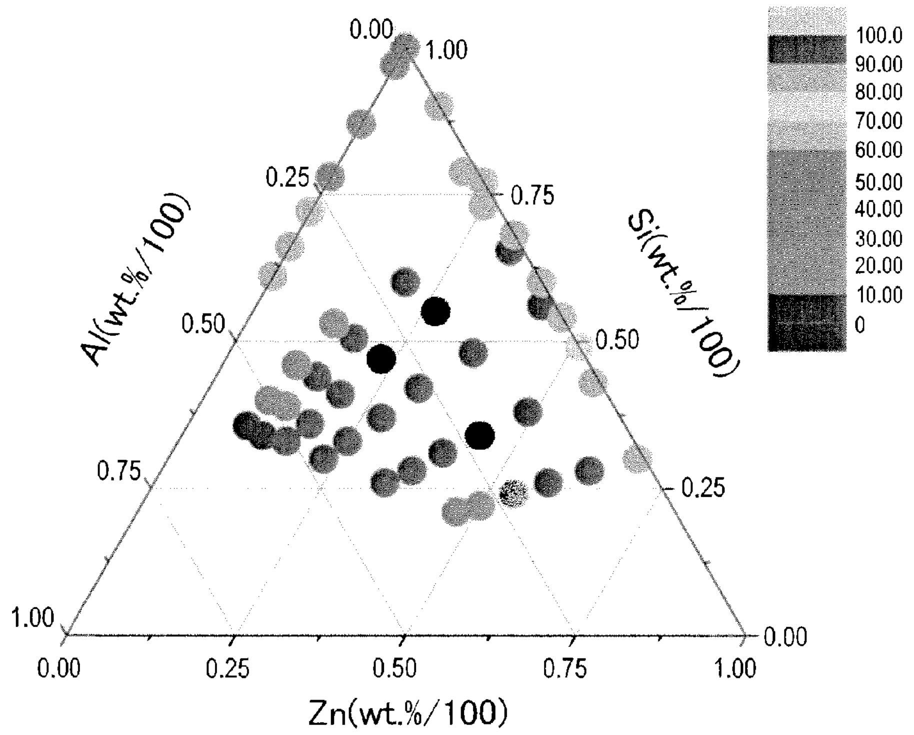
FIG. 4 is a diagram showing compositions of Si—Zn—Al ternary alloys, in which each of discharge capacity maintenance ratios (%) at 50th cycle of cells using samples (sample Nos. 1 to 48) of Example 1 is plotted, and the discharge capacity maintenance ratios are color-coded (shaded) depending on their magnitudes.

More specifically, the negative electrode active material which is in a state of newly produced (non-charged state) is a ternary amorphous alloy represented by the composition formula $Si_xZn_yAl_z$ having the above-described appropriate composition ratio. A lithium ion secondary battery using the negative electrode active material of the present embodiment has the prominent property of being capable of suppressing a large volumetric change which is caused by transition from the amorphous state to a crystal state during the alloying between Si and Li due to charge-discharge. Since it is difficult for other ternary alloys represented by $Si_xM_yAl_z$ or quaternary alloys of Patent Document 1 to maintain the high cycle property, particularly, the high discharge capacity maintenance ratio, a major problem of a rapid reduction (deterioration) of the cycle property occurs. More specifically, in the ternary and quaternary alloys of Patent Document 1, the initial capacity (discharge capacity at 1st cycle) is considerably higher than those of the existing carbon-based negative electrode active materials (theoretical capacity: 372 mAh/g) and is also high as compared to the Sn-based negative electrode active materials (theoretical capacity: about 600 to 700 mAh/g). However, the cycle property is considerably poor and unsatisfactory as compared to a discharge capacity maintenance ratio (about 60%) at 50th cycle of the Sn-based negative electrode active materials which attain the high capacity of about 600 to 700 mAh/g. In other words, the practical use is difficult due to the imbalance between the high capacity and the cycle durability which have the trade-off relationship. More specifically, though the quaternary alloy $Si_{62}Al_{18}Fe_{16}Zr_4$ of Example 1 of Patent Document 1 has the high capacity of about 1150 mAh/g as the initial capacity as indicated by FIG. 2, it is indicated by FIG. 2 that the circulation capacity after 5 to 6 cycles is only about 1090 mAh/g. In other words, in Example 1 of Patent Document 1, it is apparent from FIG. 2 that the discharge capacity maintenance ratio is largely reduced to about 95% at the 5th or 6th cycle, and that the discharge capacity maintenance ratio is reduced by substantially 1% per cycle. In view of the fact, it is assumed that the discharge capacity maintenance ratio is reduced by about 50% at the 50th cycle (i.e. the discharge capacity maintenance ratio is reduced to about 50%). Likewise, though the ternary alloy $Si_{55}Al_{29.3}Fe_{15.7}$ of Example 2 of Patent Document 1 has the high capacity of about 1430 mAh/g as the initial capacity as indicated by FIG. 4, it is indicated by FIG. 4 that the circulation capacity after only 5 to 6 cycles is largely reduced to about 1300 mAh/g. In other words, in Example 2 of Patent Document 1, it is apparent from FIG. 4 that the discharge capacity maintenance ratio is rapidly reduced to about 90% at the 5th or 6th cycle, and that the discharge capacity maintenance ratio is reduced by substantially 2% per cycle. In view of the fact, it is assumed that the discharge capacity maintenance ratio is reduced by about 100% at the 50th cycle (i.e. the discharge capacity maintenance ratio is reduced to about 50% to 0%). Though the initial capacity of each of the quaternary alloy $Si_{60}Al_{20}Fe_{12}Ti_8$ of Example 3 and the quaternary alloy $Si_{62}Al_{16}Fe_{14}Ti_8$ of Example 4 of Patent Document 1 is not disclosed, it is indicated by Table 2 that the circulation capacity after only 5 to 6 cycles is reduced to as low as 700 to 1200 mAh/g. The discharge capacity maintenance ratio at 5th or 6th cycle of Example 3 of Patent Document 1 is equal to or less than those of Examples 1 and 2, and it is assumed that the discharge capacity maintenance ratio at 50th cycle is substantially reduced by 50% to 100% (i.e. the discharge capacity maintenance ratio is reduced to about 50% to 0%). Meanwhile, the alloy compositions of Patent Document 1 are described by using atomic ratio, and it is considered that the alloy composition in which Fe is the first additive element is disclosed since about 20 mass % of Fe is considered to be contained in Examples when the atomic ratio is converted into the mass ratio as in the present embodiment.

Figure 3:
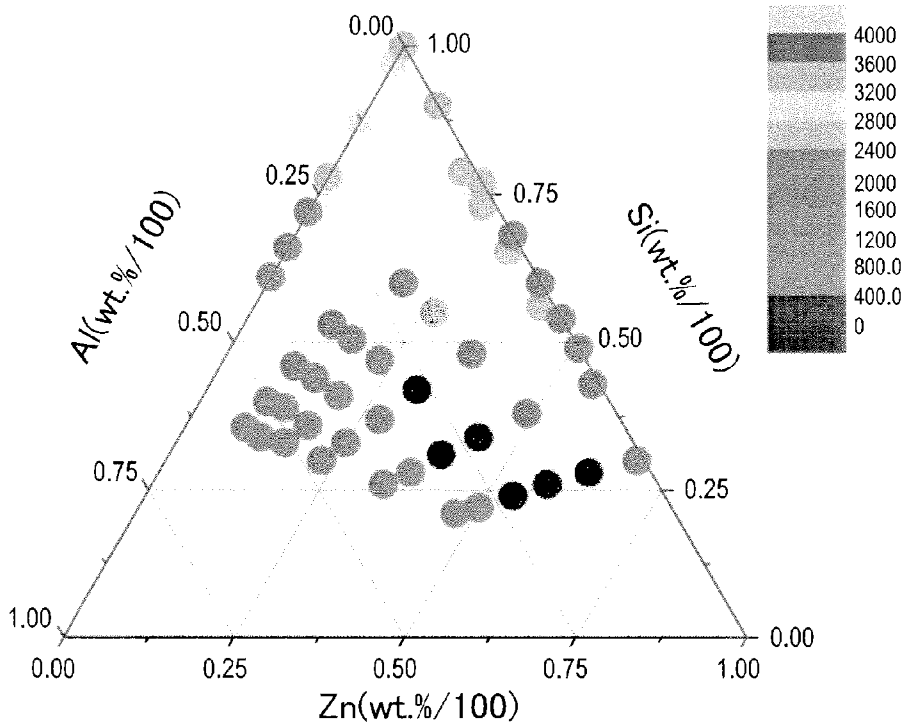
FIG. 3 is a diagram showing compositions of Si—Zn—Al ternary alloys, in which each of discharge capacities (mAhg) at 1st cycle of cells using samples (sample Nos. 1 to 48) of Example 1 is plotted, and the discharge capacities are color-coded (shaded) depending on their capacities.

Accordingly, the batteries using the existing ternary and quaternary alloys disclosed in Patent Document 1 have the problems in reliability and safety since it is difficult to sufficiently attain the cycle property which satisfies the practical use level in the field where the cycle durability is strongly in demand, such as for use in vehicles, and, therefore, it is difficult to put them into practical use. In contrast, the negative electrode active material using the ternary alloy represented by $Si_xZn_yAl_z$ of the present embodiment has the high discharge capacity maintenance ratio at 50th cycle as the high cycle property (see FIG. 4). Further, since the initial capacity (discharge capacity at 1st cycle) is significantly higher than those of the existing carbon-based negative electrode active materials and is also higher as compared to the existing Sn-based negative electrode active materials (see FIG. 3), it is possible to provide the negative electrode active material exhibiting the well-balanced property. In short, the negative electrode active martial using the alloy which attains the high-level and well-balanced high capacity and cycle durability, which have not been realized by the existing carbon-based and Sn-based negative electrode active materials and the ternary and quaternary alloys of Patent Document 1 due to the trade-off relationship, is found. More specifically, it is found that it is possible to attain the desired object by selecting the two kinds which are Zn and Al from the group consisting of one or more additive elements among considerably various combinations and, further, selecting the specific composition ratio (composition range) between the additive elements and the high capacity element Si. As a result, the excellent feature of being capable of providing a lithium ion secondary battery having high capacity and good cycle durability is attained.

Hereinafter, the negative electrode active material will be described in detail.

(1) Total Mass % Value of Alloy

The total mass % value of the alloy having the composition formula $Si_xZn_yAl_z$ is x+y+z=100 as indicated as (1) of the formula (each of x, y, and z represents a mass % value). In short, the negative electrode active material needs to contain the Si—Zn—Al ternary alloy. In other words, a binary alloy, a ternary alloy having different composition, and a quaternary alloy and multi-element alloys in which different element (s) are added are not included. However, a very small amount of a metal element or the like as an impurity which is inevitably contained in production (a very small amount of a metal element or the like which does not influence the effects of the present embodiment) may be contained. It is sufficient as long as at least one kind of alloy having the composition formula $Si_xZn_yAl_z$ is contained in the negative electrode active material layer 15 of the present embodiment, and the alloys having different two or more compositions may be used in combination.

(2) Mass % Value of Si in Alloy

The range of x of (2) in the composition formula $Si_xZn_yAl_z$, which is the mass % value of Si in the alloy having the formula, may be 21≤x<100, preferably 26≤x≤78, more preferably 26≤x≤66, and particularly preferably 26≤x≤47 (see Table 1 and FIGS. 5 to 8). The higher the value of the mass % value (value of x) of the high capacity element Si in the alloy, the higher the capacity, and, when the range is 21≤x<100, it is possible to realize the significantly high capacity (824 mAh/g or more) which is not realized by the existing carbon-based negative electrode active materials. Likewise, it is possible to obtain the alloy which has the higher capacity as compared to the existing Sn-based negative electrode active materials (see FIG. 5). Further, the range of 21≤x<100 also enables to attain the excellent discharge capacity maintenance ratio at 50th cycle (cycle durability).

From the viewpoints of providing the negative electrode active material which exhibits the well-balanced property of maintaining the high cycle property (particularly the high discharge capacity maintenance ratio at 50th cycle) and attaining the high initial capacity, the mass % value (value of x) of high capacity element Si in the alloy may preferably be within the range of 26≤x≤78. Also, in the case where a composition ratio between Zn which is the first additive element and Al which is the second additive element is appropriate (the first additive element and the second additive element are described later in this specification), it is possible to realize a Si alloy negative electrode active material having a favorable property (property of being excellent in both of the high capacity and the cycle durability which have the trade-off relationship in the existing alloy-based negative electrode active materials). In short, though there is a tendency that a high capacity is attained and cycle durability is reduced when the numerical value of mass % value (value of x) of high capacity element Si in an alloy is high, the range of 26≤x≤78 is preferred in terms of the feature of enabling to maintain the high capacity (1072 mAh/g or more) and the high discharge capacity maintenance ratio (85% or more) (see Table 1 and FIG. 6).

From the viewpoints of providing the negative electrode active material which exhibits the well-balanced property of maintaining the higher cycle property (higher discharge capacity maintenance ratio) and attaining the high initial capacity, the mass % value (value of x) of high capacity element Si in the alloy may more preferably be within the range of 26≤x≤66. Also, in the case where a composition ratio between Zn which is the first additive element and Al which is the second additive element is appropriate (the first additive element and the second additive element are described later in this specification), it is possible to provide a Si alloy negative electrode active material having a more favorable property (see Table 1 and the part enclosed by the thick line in FIG. 7). In short, the range of 26≤x≤66 is more excellent in terms of the feature of enabling to maintain the high capacity (1072 mAh/g or more) and the higher discharge capacity maintenance ratio at 50th cycle (90% or more) (see Table 1 and the part enclosed by the thick line in FIG. 7).

From the viewpoints of providing the negative electrode active material which exhibits the well-balanced property of maintaining the particularly high cycle property (particularly high discharge capacity maintenance ratio) and attaining the high initial capacity, the mass % value (value of x) of high capacity element Si in the alloy may particularly preferably be within the range of 26≤x≤47. Also, in the case where a composition ratio between Zn which is the first additive element and Al which is the second additive element is appropriate (the first additive element and the second additive element are described later in this specification), it is possible to provide a high-performance Si alloy negative electrode active material having the most favorable property (see Table 1 and the part enclosed by the thick line in FIG. 8). In short, the particularly preferred range of 26≤x≤47 is particularly excellent in terms of the feature of enabling to maintain the high capacity (1072 mAh/g or more) and the particularly high discharge capacity maintenance ratio at 50th cycle (95% or more) (see Table 1 and the part enclosed by the thick line in FIG. 8). In contrast to the ternary alloy represented by the composition formula $Si_xZn_yAl_z$, it is difficult for a binary alloy (particularly Si—Al alloy in which y=0 or Si—Zn alloy in which z=0) which does not contain either one of the metal elements (Zn and Al) to be added to Si to maintain the high cycle property. Particularly, it is difficult for the binary alloy to maintain the high discharge capacity maintenance ratio at 50th cycle, thereby causing the major problem of the reduction (deterioration) of cycle property. Therefore, the binary alloy is not capable of realizing the most well-balanced high capacity and the particularly high discharge capacity maintenance ratio at 50th cycle. Also, in the case of x=100 (in the case of pure Si which does not contain the metal elements Zn and Al to be added to Si), the capacity and the cycle durability have the trade-off relationship, and it is remarkably difficult to improve the high cycle durability while maintaining the high capacity. In short, since only Si which is the high capacity element is used, the deterioration as the negative electrode active material becomes more prominent due to the expansion/shrinkage phenomenon of Si along with charge-discharge though the highest capacity is attained, resulting in the worst and significantly low discharge capacity maintenance ratio. Therefore, the most well-balanced high capacity and particularly high discharge capacity maintenance ratio at 50th cycle is not realized.

Figure 6:
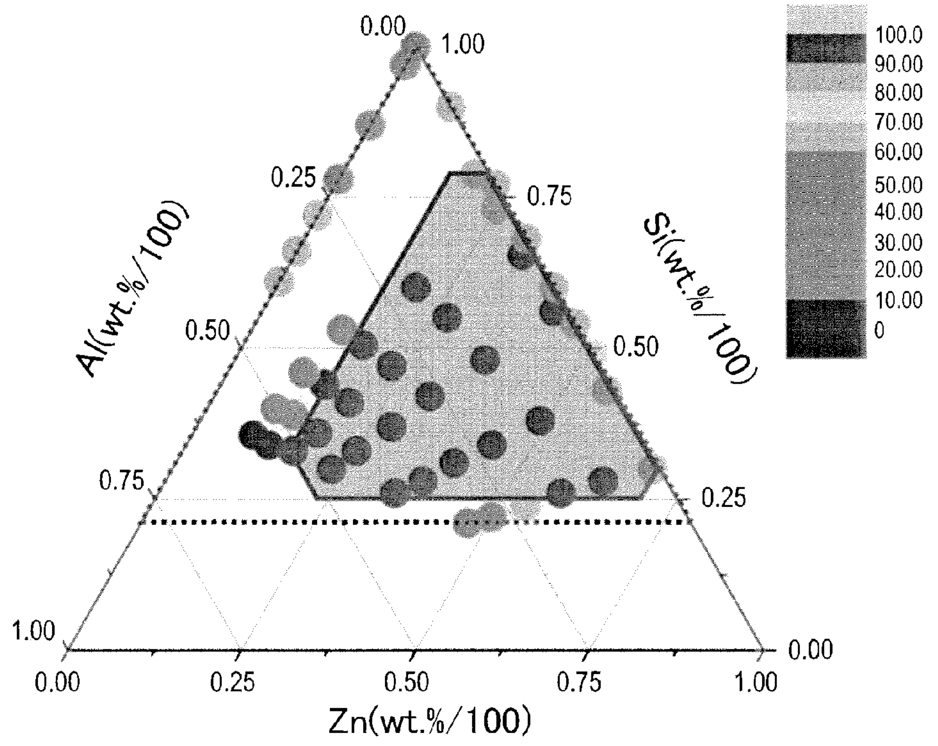
FIG. 6 is a diagram in which preferred composition ranges among the composition ranges of the Si—Zn—Al alloy samples of Example 1 are enclosed and color-coded (shaded) on the diagram of the compositions of the Si—Zn—Al ternary alloys of FIG. 4, wherein Si+Zn+Al (unit of each of the elements is wt %/100)=1.00, (2) 0.26≤Si (wt %/100)≤0.78, (3) 0.16≤Zn (wt %/100) and (4) 0<Al (wt %/100)≤0.51.
Figure 7:
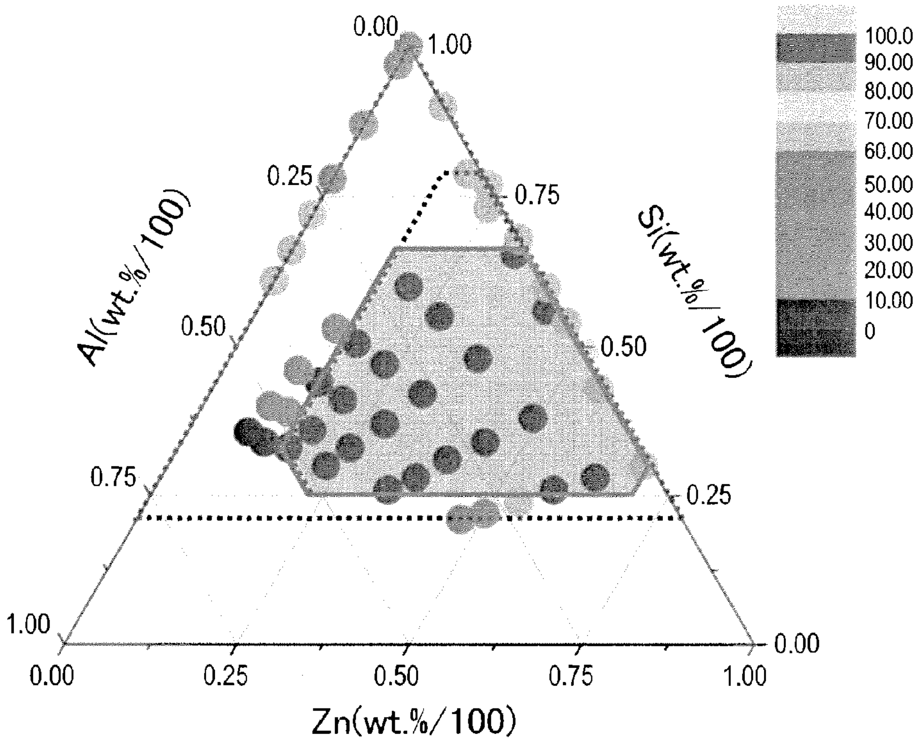
FIG. 7 is a diagram in which more preferred composition ranges among the composition ranges of the Si—Zn—Al alloy samples of Example 1 are enclosed and color-coded (shaded) on the diagram of the compositions of the Si—Zn—Al ternary alloys of FIG. 4, wherein Si+Zn+Al (unit of each of the elements is wt %/100)=1.00, (2) 0.26≤Si (wt %/100) ≤0.66, (3) 0.16≤Zn (wt %/100)≤0.69, and (4) 0.02≤Al (wt %/100)≤0.51.
Figure 8:
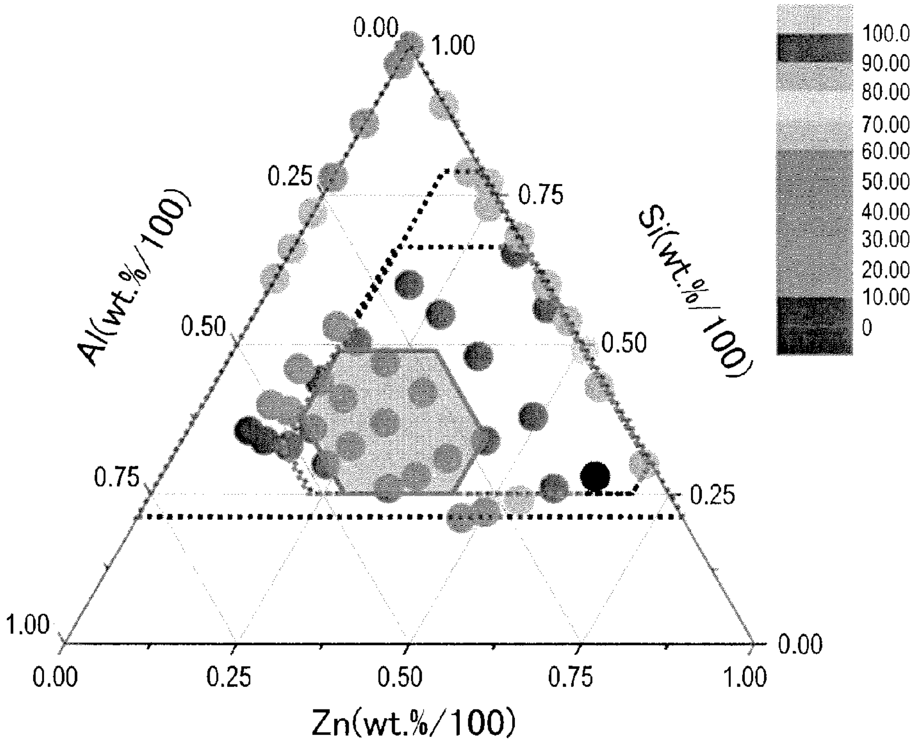
FIG. 8 is a diagram in which particularly preferred composition ranges among the composition ranges of the Si—Zn—Al alloy samples of Example 1 are enclosed and color-coded (shaded) on the diagram of the compositions of the Si—Zn—Al ternary alloys of FIG. 4, wherein Si+Zn+Al (unit of each of the elements is wt %/100)=1.00, (2) 0.26≤Si (wt %/100)≤0.47, (3) 0.18≤Zn (wt %/100)≤0.44, and (4) 0.22≤Al (wt %/100)≤0.46.

In the case of $x \geq 26$, it is possible to attain the range within which a content ratio (balance) among the Si material having the initial capacity of 3200 mAh/g, the first additive element Zn, and the second additive element Al is optimized (see the part enclosed by the thick line in each of FIGS. 6 to 8). Therefore, it is possible to exhibit the most favorable property, and the excellent feature of stably and safely maintaining the high capacity for use in vehicles for a long time is attained. In contrast, in the case of $x \leq 78$, particularly $x \leq 66$, or especially $x \leq 47$, it is possible to attain the range within which a content ratio (balance) among the high capacity Si material having the initial capacity of 3200 mAh/g, the first additive element Zn, and the second additive element Al is optimized (see the range enclosed by the thick line in each of FIGS. 6 to 8). Therefore, it is possible to largely improve a cycle life by largely suppressing the amorphous-crystal phase transition during the alloying between Si and Li. In short, it is possible to attain the discharge capacity maintenance ratio at 50th cycle of 85% or more, particularly 90% or more, or especially 95% or more. It should be understood that the range which enables to effectively exhibit the above-described effects of the present embodiment is encompassed by the technical scope (scope of patent right) of the present invention even in the case where x deviates from the optimum ranges ($26 \leq x \leq 78$, particularly $26 \leq x \leq 66$, and especially $26 \leq x \leq 47$).

Also, Patent Document 1 mentioned above discloses in Examples that the cycle property deterioration phenomenon is caused by the large capacity reduction only after 5 to 6 cycles. In short, in Examples of Patent Document 1, the discharge capacity maintenance ratio at the 5th or 6th cycle is reduced to 90% to 95%, and the discharge capacity maintenance ratio at 50th cycle will be reduced to about 50% to 0%. In contrast, in the present embodiment, the combination (only one combination) of the first additive element Zn and the second additive element Al which are to be added to the high capacity Si material and have the mutually complementing relationship is selected through a multitude of trials and errors and excessive experiments using combinations of various elements (metal and nonmetal). Also, the combination in which the content of the high capacity Si material is further adjusted to the above-specified optimum range is excellent in attaining the high capacity and in largely suppressing a reduction of the discharge capacity maintenance ratio at 50th cycle. In short, it is possible to prevent a large volumetric change by suppressing transition from the amorphous state to the crystal state through the significantly prominent synergy action (effect) which is attained by the optimum range of the first additive element Zn and the second additive element Al having the mutually complementing relationship with Zn in the alloying between Si and Li. Further, the excellent feature of being capable of exhibiting the high capacity and improving the high cycle durability of the electrode is attained (see Table 1 and FIGS. 6 to 8).

(3) Mass % Value of Zn in Alloy

The range of y of (3) in the composition formula $Si_xZn_yAl_z$, which is the mass % value of Zn in the alloy having the formula, is $0<y<79$, preferably $16 \leq y \leq 69$, and particularly preferably $18 \leq y \leq 44$. When the numerical value of the mass % value (value of y) of the first additive element Zn in the alloy is within the range of $0<y<79$, by the property of Zn (further by the synergy with Al), it is possible to effectively suppress the amorphous-crystal phase transition of the high capacity Si material. As a result, it is possible to exhibit an excellent effect on a cycle life (cycle durability), particularly on the high discharge capacity maintenance ratio at 50th cycle (85% or more, particularly 90% or more, especially 95% or more) (see FIGS. 6 to 8). Also, since it is possible to maintain the numerical value of the content (value of x) of the high capacity Si material to a certain value or more ($21 \leq x<100$), it is possible to realize the significantly high capacity which is not realized by the existing carbon-based negative electrode active materials. Likewise, it is possible to obtain the alloy having the higher capacity (initial capacity of 824 mAh/g or more, particularly 1072 mAh/g or more) which is higher than those of the existing Sn-based alloy negative electrode active materials (see Table 1 and FIGS. 5 to 8).

The mass % value (value of y) of the first additive element Zn in the alloy may preferably be $16 \leq y \leq 69$ from the viewpoint of providing the negative electrode active material which exhibits the well-balanced property of maintaining the high cycle property (particularly, high discharge capacity maintenance ratio at 50th cycle) and attaining the high initial capacity. In the alloying with Li, it is possible to provide the Si alloy negative electrode active material having favorable property in the case where the content ratio of the first additive element Zn having the effect of suppressing the amorphous-crystal phase transition and improving the cycle life is appropriate (see Table 1 and the composition ranges enclosed by the thick line in FIGS. 6 and 7). In short, the numerical value of the mass % value (value of y) of the first additive element Zn in the alloy which is within the preferred range $16 \leq y \leq 69$ is preferred from the viewpoints of enabling to effectively exhibit the effect of suppressing the amorphous-crystal phase transition and improving the cycle life and to maintain the high discharge capacity maintenance ratio at 50th cycle (85% or more, particularly 90% or more) (see Table and FIGS. 6 and 7). In this case, the composition ranges (particularly, Zn content of $16 \leq y \leq 69$) which actually enabled to realize the high capacities in Samples 1 to 35 of Example 1 are selected (hexagon enclosed by the thick line in each of FIGS. 6 and 7). It is possible to provide the Si alloy negative electrode active material which realizes the significantly excellent cycle durability (discharge capacity maintenance ratio of 85% or more, particularly 90% or more) as compared to the existing Sn-based negative electrode active materials and the multi-element alloy negative electrode active materials disclosed in Patent Document 1 by selecting the above-described composition ranges, particularly $16 \leq y \leq 69$, as the Zn content (see Table 1 and FIGS. 6 and 7).

The mass % value (value of y) of the first additive element Zn in the alloy may particularly preferably be within the range of $18 \leq y \leq 44$ from the viewpoint of providing the negative electrode active material which exhibits the most well-balanced property of maintaining the higher cycle property (high discharge capacity maintenance ratio at 50th cycle) and attaining the high initial capacity. It is possible to provide the Si alloy negative electrode active material having the most favorable property in the case where the content ratio of the first additive element Zn having the effect of suppressing the amorphous-crystal phase transition in the alloying with Li, and improving the cycle life is most appropriate (see Table 1 and FIG. 8). In short, $18 \leq y \leq 44$ which is the particularly preferred range enables to effectively exhibit the effect of suppressing the amorphous-crystal phase transition in the alloying and improving the cycle life and to maintain the high discharge capacity maintenance ratio at 50th cycle of 95% or more (see Table 1 and FIG. 8). Particularly in this case, the composition ranges (particularly, Zn content of $18 \leq y \leq 44$) which actually enabled to realize the especially higher capacities and the high discharge capacity maintenance ratios at 50th cycle of 95% or more in Samples 1 to 35 of Example 1 are selected (smallest hexagon enclosed by the thick line in FIG. 8). It is possible to provide the Si alloy negative electrode active material which realizes the high capacity and the significantly excellent cycle durability (higher discharge capacity maintenance ratio) as compared to the Sn-based negative electrode active materials and the multi-element alloy negative electrode active materials disclosed in Patent Document 1 by selecting the above-described composition ranges, particularly 18≤y≤44, as the Zn content. In contrast to the ternary alloy represented by the composition formula $Si_xZn_yAl_z$, it is difficult for a binary alloy which does not contain either one of the metal elements (Zn and Al) to be added to Si (particularly Si—Al alloy in which y=0) to maintain the high cycle property. Particularly, it is difficult for the binary alloy to maintain the high discharge capacity maintenance ratio at 50th cycle, thereby causing the major problem of the reduction (deterioration) of cycle property. Therefore, the binary alloy does not enable to give the Si alloy negative electrode active material having the most well-balanced high capacity and particularly high discharge capacity maintenance ratio at 50th cycle.

In the case of y≤16, particularly y≤18, it is possible to maintain a content ratio (balance) between the high capacity Si material having the initial capacity of 3200 mAh/g and the first additive element Zn (and the remaining second additive element Al) within the optimum range (see the range enclosed by the thick line in each of FIGS. 6 to 8). Therefore, it is possible to attain the property of Zn (and synergy with Al) of effectively suppressing the amorphous-crystal phase transition of the Si material and greatly improving the cycle life (particularly, discharge capacity maintenance ratio). More specifically, it is possible to realize the discharge capacity maintenance ratio at 50th cycle of 85% or more, particularly 90% or more, or especially 95% or more. As a result, it is possible to exhibit the most favorable property as the negative electrode active material (negative electrode), and the excellent feature of stably and safely maintaining the high capacity for use in vehicles for a long time is attained. In the case of y≤69, particularly y≤44, it is possible to attain the range within which a content ratio (balance) between the high capacity Si material having the initial capacity of 3200 mAh/g and the first additive element Zn (and the second additive element Al) is optimized (see the range enclosed by the thick line in each of FIGS. 6 to 8). Therefore, it is possible to greatly improve the cycle life by largely suppressing the amorphous-crystal phase transition in the alloying between Si and Li. In short, it is possible to attain the discharge capacity maintenance ratio at 50th cycle of 85% or more, particularly 90% or more, or especially 95% or more. It should be understood that the range which enables to effectively exhibit the above-described effects of the present embodiment is encompassed by the technical scope (scope of patent right) of the present invention even in the case where y deviates from the optimum ranges (16≤y≤69, particularly 18≤y≤44).

Also, Patent Document 1 mentioned above discloses in Examples that the cycle property deterioration phenomenon is caused by the large capacity reduction only after 5 to 6 cycles. In short, in Examples of Patent Document 1, the discharge capacity maintenance ratio at the 5th or 6th cycle is reduced to 90% to 95%, and the discharge capacity maintenance ratio at 50th cycle may be reduced to about 50% to 0%. In contrast, in the present embodiment, the combination (only one combination) of the first additive element Zn and the high capacity Si material (and, further, the combination with the second additive element Al having the mutually complementing relationship) is selected through a multitude of trials and errors and excessive experiments using combinations of various elements (metal and nonmetal). Also, the combination in which the content of Zn is further adjusted to the above-specified optimum range is excellent in largely suppressing the reduction of the discharge capacity maintenance ratio at 50th cycle. In short, it is possible to prevent a large volumetric change by suppressing transition from the amorphous state to the crystal state in the alloying between Si and Li by the significantly prominent synergy action (effect) which is attained by the optimum range of the first additive element Zn (and, further, the second additive element Al which has the mutually complementing relationship with Zn). Further, the excellent feature of being capable of exhibiting the high capacity and improving the high cycle durability of the electrode is attained (see Table 1 and FIGS. 6 to 8).

(4) Mass % Value of Al in Alloy

The range of z of (4) in the composition formula $Si_xZn_yAl_z$, which is the mass % value of Al in the alloy having the formula, is 0<z<79, preferably 0<z≤51, more preferably 2≤z≤51, and particularly preferably 22≤z≤46. When the numerical value of the mass % value (value of z) of the second additive element Al which does not cause a reduction of capacity of the electrode even when a concentration of the first additive element is increased in the alloy is within the range of 0<z<79, it is possible to effectively suppress the amorphous-crystal phase transition of the high capacity Si material by the properties of Zn and by the synergy with Al. As a result, it is possible to exhibit an excellent effect on a cycle life (cycle durability), particularly on the high discharge capacity maintenance ratio at 50th cycle (85% or more, particularly 90% or more, especially 95% or more) (see Table 1 and FIGS. 6 to 8). Also, since it is possible to maintain the numerical value of a content (value of x) of the high capacity Si material to a certain value or more (21≤x<100), it is possible to realize the significantly high capacity which is not realized by the existing carbon-based negative electrode active materials. Likewise, it is possible to obtain the alloy having the high capacity (initial capacity of 824 mAh/g or more, particularly 1072 mAh/g or more) which is equal to or more than those of the existing Sn-based negative electrode active materials (see Table 1 and FIGS. 5 to 8).

The mass % value (value of z) of the second additive element Al in the alloy may preferably be 0<z≤51 from the viewpoint of providing the negative electrode active material which exhibits the well-balanced property of maintaining the high cycle property (particularly, high discharge capacity maintenance ratio at 50th cycle) and attaining the high initial capacity. Selections of the first additive element Zn which suppresses the amorphous-crystal phase transition in the alloying with Li, and improves the cycle life and the second additive element Al which does not reduce the capacity as the negative electrode active material (negative electrode) even when the first additive element concentration is increased are considerably important and useful in the present embodiment. It was found that a prominent difference in effect is created by the first and second additive elements as compared to the known ternary alloys, quaternary and multi-element alloys of Patent Document 1, and the like as well as the binary alloys such as a Si—Zn alloy and a Si—Al alloy. It is possible to provide the Si alloy negative electrode active material having favorable property in the case where the content ratio of the second additive element Al (and the content ratio of the first additive element Zn which has the mutually complementing relationship with Al) is appropriate (see Table 1 and the composition range enclosed by the thick line in FIG. 6). In short, it is possible to effectively exhibit the effect of suppressing the amorphous-crystal phase transition in the alloying and improving the cycle life owing to the synergy effect with the first additive element Zn (mutually complementing property) when the numerical value of the mass % value (value of z) of the second additive element Al in the alloy is within the preferred range of $0<z\leq51$. As a result, it is possible to maintain the high discharge capacity maintenance ratio at 50th cycle (85% or more) (see Table 1 and FIG. 6). In this case, the composition ranges (particularly, Zn content of $0<z\leq51$) which actually enabled to realize the high capacities in Samples 1 to 35 of Example 1 are selected (hexagon enclosed by the thick line in FIG. 6). It is possible to realize the significantly excellent cycle durability owing to the synergy effect with the first additive element Zn as compared to the existing high capacity Sn-based negative electrode active materials and the multi-element alloy negative electrode active materials disclosed in Patent Document 1 by selecting the above-described composition ranges, particularly $0<z\leq51$, as the Zn content. As a result, it is possible to provide the Si alloy negative electrode active material which realizes the discharge capacity maintenance ratio at 50th cycle of 85% or more (see Table 1 and the composition range enclosed by the thick line in FIG. 6).

The mass % value (value of z) of the second additive element Al in the alloy may particularly preferably be within the range of $2\leq z\leq51$ from the viewpoint of providing the negative electrode active material which exhibits the considerably well-balanced property of maintaining the higher cycle property (high discharge capacity maintenance ratio at 50th cycle) and attaining the high initial capacity. This is because, it is possible to provide the Si alloy negative electrode active material having more favorable property in the case where the content ratio of the second additive element Al which is capable of attainting the effect of suppressing the amorphous-crystal phase transition in the alloying with Li and improving the cycle life by the synergy effect (mutually complementing property) with Zn is more appropriate. In short, the particularly preferred range of $2\leq z\leq51$ enables to more effectively exhibit the effect of suppressing the amorphous-crystal phase transition in the alloying and improving the cycle life owing to the synergy effect (mutually complementing property) with Zn. As a result, it is possible to maintain the higher discharge capacity maintenance ratio at 50th cycle of 90% or more (see Table 1 and FIG. 7). Particularly in this case, the composition ranges (particularly, Al content of $2\leq z\leq51$) which actually enabled to realize the high capacities and the high discharge capacity maintenance ratios at 50th cycle of 90% or more in Samples 1 to 35 of Example 1 are selected (small hexagon enclosed by the thick line in FIG. 7). It is possible to provide the Si alloy negative electrode active material which realizes, owing to the synergy with Zn, the high capacity and the significantly excellent cycle durability as compared to the existing high capacity Sn-based negative electrode active materials and the multi-element alloy negative electrode active materials disclosed in Patent Document 1 by selecting the above-described composition ranges, particularly $2\leq z\leq51$, as the Al content.

The mass % value (value of z) of the second additive element Al in the alloy may especially preferably be within the range of $22\leq z\leq46$ from the viewpoint of providing the negative electrode active material which exhibits the most well-balanced property of maintaining the higher cycle property (high discharge capacity maintenance ratio at 50th cycle) and attaining the high initial capacity. This is because, it is possible to provide the Si alloy negative electrode active material having the most favorable property in the case where the content ratio of the second additive element Al which is capable of attainting the effect of suppressing the amorphous-crystal phase transition in the alloying with Li and improving the cycle life by the synergy effect (mutually complementing property) with Zn is most appropriate. In short, the particularly preferred range of $22\leq z\leq46$ enables to more effectively exhibit the effect of suppressing the amorphous-crystal phase transition in the alloying and improving the cycle life owing to the synergy effect (mutually complementing property) with Zn. As a result, it is possible to maintain the much higher discharge capacity maintenance ratio at 50th cycle of 95% or more (see Table 1 and FIG. 8). Particularly in this case, the composition ranges (particularly, Al content of $22\leq z\leq46$) which actually enabled to realize the higher capacities and the high discharge capacity maintenance ratios at 50th cycle of 95% or more in Samples 1 to 35 of Example 1 are selected (smallest hexagon enclosed by the thick line in FIG. 8). It is possible to provide the Si alloy negative electrode active material which realizes, owing to the synergy with Zn, the high capacity and the significantly excellent cycle durability as compared to the existing high capacity Sn-based negative electrode active materials and the multi-element alloy negative electrode active materials disclosed in Patent Document 1 by selecting the above-described composition ranges, particularly $22\leq x\leq46$, as the Al content. In contrast, it is difficult for a binary alloy (particularly Si—Zn alloy in which z=0) which does not contain either one of the metal elements (Zn and Al) to be added to Si of the ternary alloy represented by the composition formula $Si_xZn_yAl_z$ to maintain the high cycle property. Particularly, it is difficult for the binary alloy to maintain the high discharge capacity maintenance ratio at 50th cycle, thereby causing the major problem of the reduction (deterioration) of cycle property. Therefore, the binary alloy does not enable to give the Si alloy negative electrode active material having the most well-balanced high capacity and the excellent cycle durability (particularly high discharge capacity maintenance ratio at 50th cycle).

In the case of $z\leq2$, particularly $z\leq22$, it is possible to maintain a content ratio (balance) among the high capacity Si material having the initial capacity of 3200 mAh/g, the first additive element Zn, and the second additive element Al within the optimum range (see the range enclosed by the thick line in each of FIGS. 7 and 8). Therefore, it is possible to attain the property of Al of effectively suppressing the reduction of capacity as the negative electrode active material (negative electrode) even when the concentration of Zn which is capable of suppressing the amorphous-crystal phase transition is increased and greatly improving the cycle life (particularly, discharge capacity maintenance ratio). More specifically, it is possible to realize the discharge capacity maintenance ratio at 50th cycle of 90% or more, particularly 95% or more. As a result, it is possible to exhibit the most favorable property as the negative electrode active material (negative electrode), and the excellent feature of stably and safely maintaining the high capacity for use in vehicles for a long time is attained. In the case of $z\leq51$, particularly $z\leq46$, it is possible to attain the range within which a content ratio (balance) among the high capacity Si material having the initial capacity of 3200 mAh/g, the first additive element Zn, and the second additive element Al is optimized (see the range enclosed by the thick line in each of FIGS. 6 to 8). Therefore, it is possible to greatly improve the cycle life (particularly, discharge capacity maintenance ratio at 50th cycle) by largely suppressing the amorphous-crystal phase transition when the alloying between Si and Li. In short, it is possible to attain the discharge capacity maintenance ratio at 50th cycle of 85% or more, particularly 90% or more, or especially 95% or more. It should be understood that the range which enables to effectively exhibit the above-described effects of the present embodiment is encompassed by the technical scope (scope of patent right) of the present invention even in the case where z deviates from the optimum ranges ($2 \leq z \leq 51$, particularly $22 \leq z \leq 46$).

Also, Patent Document 1 mentioned above discloses in Examples that the cycle property deterioration phenomenon is caused by the large capacity reduction only after 5 to 6 cycles. In short, in Examples of Patent Document 1, the discharge capacity maintenance ratio at the 5th or 6th cycle is reduced to 90% to 95%, and the discharge capacity maintenance ratio at 50th cycle will be reduced to about 50% to 0%. In contrast, in the present embodiment, the combination (only one combination) of the first additive element Zn and the second additive element Al having the mutually complementing relationship relative to the high capacity Si material is selected through a multitude of trials and errors and excessive experiments using combinations of various elements (metal and nonmetal). Also, the combination in which the content of Al is further adjusted to the above-specified optimum range is excellent in largely suppressing the reduction of the discharge capacity maintenance ratio at 50th cycle. In short, it is possible to prevent a large volumetric change by suppressing transition from the amorphous state to the crystal state in the alloying between Si and Li by the significantly prominent synergy action (effect) which is attained by the optimum range of the second additive element Al (and, further, the first additive element Zn having the mutually complementing relationship with Al). Further, the excellent feature of being capable of exhibiting the high capacity and improving the high cycle durability of the electrode is attained.

(5) Method for Producing Alloy Having Composition Formula $Si_xZn_yAl_z$

As a method for producing the alloy having the composition formula $Si_xZn_yAl_z$, known various production methods may be employed for the production without particular limitation. In short, since a state and properties of the alloy are scarcely varied by the production methods, it is possible to employ various many production methods.

More specifically, as (i) a method for producing a thin film form of the alloy having the composition formula $Si_xZn_yAl_z$, multi-element PVD (sputtering (method employed in Examples), resistance heating, or laser abrasion), multi-element CVD (chemical vapor phase deposition), or the like may be employed, for example.

As (ii) a method for producing a particle form of the alloy having the composition formula $Si_xZn_yAl_z$, mechanical alloying, arc plasma melting, or the like may be employed, for example.

In the alloy thin film production method of (i), it is possible to obtain a negative electrode (electrode) by forming (film formation) the alloy thin film directly on a current collector. Therefore, the method is excellent in simplification of processes. Further, it is unnecessary to use components such as a binder and a conductive auxiliary agent for forming the negative electrode active material layer (negative electrode) in addition to the alloy, and it is possible to form the thin film electrode solely from the alloy (negative electrode active material). Therefore, the method is excellent in attaining high capacity and high energy density which satisfy the practical use for vehicles. Also, the method is appropriate for investigating electrochemical characteristics of the active material.

It is possible to arbitrarily form the $Si_xZn_yAl_z$ alloy thin films which are varied in alloy composition and thickness on a substrate (current collector) surface by using, as the alloy thin film production method of (i), an independently controlled ternary DC magnetron sputtering apparatus as a multi-element DC magnetron sputtering apparatus. For example, it is possible to obtain various alloy samples by setting the target 1 to Si, the target 2 to Zn, and the target 3 to Al, fixing a sputtering time, and changing a power level of a DC power source (for more specific description, see Samples 1 to 48 of Example 1). For example, it is possible to obtain ternary alloy samples having various composition formulas by changing the power level of the DC power source to 185 W for Si, 50 W for Zn, and 50 W for Al. However, since sputtering conditions are varied among sputtering apparatuses, it is desirable to figure out, for each sputtering apparatus, the preferred range of the sputtering conditions through an appropriate preliminary experiment or the like. For more specific description, see the sputtering conditions, target specs, electrode sample specs in the sputtering apparatus described in Example 1. For example, the following is a preferred range of the power level of the DC power source in the case where the sputtering time is fixed, when adopting the sputtering conditions, target specs, electrode sample specs in the sputtering apparatus described in Examples. That is, the preferred range of the power level of the DC power source is the range of Si: 185 W, Zn: 30 to 90 W, and Al: 30 to 180 W. Within such range, it is possible to form the alloy in the amorphous state having the composition formula $Si_xZn_yAl_z$ into the thin film form. However, these values are merely the preferred range (reference value) under the sputtering conditions, the target specs, and the electrode sample specs in the sputtering apparatus described in Example 1 and are varied among sputtering apparatuses as described above. Therefore, it is desirable to figure out, for each sputtering apparatus, the preferred ranges of the sputtering conditions, the target specs, the electrode sample specs, and the like through appropriate preliminary experiments or the like.

On the other hand, in the method of producing the particle form of (ii), it is possible to form a slurry electrode by using a slurry prepared by adding a binder, a conductive auxiliary agent, and a viscosity adjusting solvent to the particles. Therefore, the method facilitates mass production (bulk production) as compared to (i) and is excellent in facilitating practical use of electrodes for the actual use in batteries. Since influences of the binder and the conductive auxiliary agent are large, it is considered that (i) is more appropriate for observing characteristics of active materials.

(6) Average Particle Diameter of Alloy in Particle Form

In the case of using the alloy in the particle form of (5) (ii), an average particle diameter of the alloy may be substantially equal to an average particle diameter of the negative electrode active material contained in the existing negative electrode active material layer 15 without particular limitation. From the viewpoint of high output, a range of 1 to 20 μm is preferred. However, the above-specified range is not limitative at all, and, of course, the average particle diameter may deviate from the above-specified range as long as the effects of the present embodiment are effectively exhibited.

(Requirements Common in Positive and Negative Electrode Active Material Layers 13 and 15)

Hereinafter, the requirements common in the positive and negative electrode active material layers 13 and 15 will be described.

In the case of using the alloy in particle form of (5) (ii), the positive electrode active material layer 13 and the negative electrode active material layer 15 contain a binder.

Examples of the binder to be used for the active material layers include, but are not particularly limited to, the following materials: a thermoplastic polymer such as polyethylene, polypropylene, polyethylene terephthalate (PET), polyethernitrile (PEN), polyacrylonitrile, polyimide, polyamide, cellulose, carboxymethylcellulose (CMC), an ethylene-vinyl acetate copolymer, polyvinyl chloride, a styrene butadiene rubber (SBR), an isoprene rubber, a butadiene rubber, an ethylene propylene rubber, an ethylene propylene diene copolymer, a styrene butadiene styrene block copolymer and hydrogenated matters thereof, and a styrene isoprene styrene block copolymer and hydrogenated matters thereof; a fluorine resin such as polyvinylidene fluoride (PVdF), polytetrafluoroethylene (PTFE), a tetrafluoroethylene hexafluoropropylene copolymer (FEP), a tetrafluoroethylene perfluoroalkylvinylether copolymer (PFA), an ethylene tetrafluoroethylene copolymer (ETFE), polychlorotrifluoroethylene (PCTFE), an ethylene chlorotrifluoroethylene copolymer (ECTFE), and polyvinyl fluoride (PVF); a vinylidene fluoride-based fluorine rubber such as a vinylidene fluoride-hexafluoropropylene-based fluorine rubber (VDF-HFP-based fluorine rubber), a vinylidene fluoride-hexafluoropropylene-tetrafluoroethylene-based fluorine rubber (VDF-HFP-TFE-based fluorine rubber), a vinylidene fluoride-pentafluoropropylene-based fluorine rubber (VDF-PFP-based fluorine rubber), a vinylidene fluoride-pentafluoropropylene-tetrafluoroethylene-based fluorine rubber (VDF-PFP-TFE-based fluorine rubber), a vinylidene fluoride-perfluoromethylvinylether-tetrafluoroethylene-based fluorine rubber (VDF-PFMVE-TFE-based fluorine rubber), and a vinylidene fluoride-chlorotrifluoroethylene-based fluorine rubber (VDF-CTFE-based fluorine rubber); and an epoxy resin. Among these, the polyvinylidene fluoride, polyimide, styrene butadiene rubber, carboxymethylcellulose, polypropylene, polytetrafluoroethylene, polyacrylonitrile, and polyamide are more preferred. Since the preferred binders are excellent in heat resistance, have a remarkably wide potential window, and attain stable positive electrode potential and negative electrode potential, the binders are usable for the active material layers. The binders may be used alone or in combination of two or more.

An amount of the binder to be contained in each of the active material layers is not particularly limited as long as the active material is bound and may preferably be 0.5 to 15 mass %, more preferably 1 to 10 mass %, with respect to the active material layer.

Examples of other additives which can be contained in the active material layers include a conductive auxiliary agent, an electrolyte salt (lithium salt), and an ion-conducting polymer.

The term “conductive auxiliary agent” means an additive to be blended for the purpose of improving conductivity of the positive electrode active material layer or the negative electrode active material layer. Examples of the conductive auxiliary agent include carbon black such as acetylene black, and a carbon material such as graphite and vapor-grown carbon fiber. When the active material layer contains the conductive auxiliary agent, an electron network inside the active material layer is effectively formed to contribute to improvement in output property of the battery.

Also, a conductive binder having the functions of the conductive auxiliary agent and the binder may be used in place of the conductive auxiliary agent and the binder or may be used in combination with one or both of the conductive auxiliary agent and the binder. As the conductive binder, commercially available TAB-2 (manufactured by Hohsen Corp.) is usable.

Examples of the electrolyte salt (lithium salt) include $Li(C_2F_5SO_2)_2N$, $LiPF_6$, $LiBF_4$, $LiClO_4$, $LiAsF_6$, and $LiCF_3SO_3$.

Examples of the ion-conducting polymer include polyethylene oxide (PEO)-based and polypropylene oxide (PPO)-based polymers.

In the case where the alloy in particle form of (5) (ii) is used, a mixing ratio of the components to be contained in each of the positive electrode active material layer and the negative electrode active material layer is not particularly limited. The mixing ratio may be adjusted by appropriately referring to the known findings on non-aqueous secondary batteries.

The thickness of each of the active material layers (active material layer on one surface of current collector) is not particularly limited, either, and the known findings on batteries may be appropriately referred to. As one example, the thickness of the active material layer may ordinarily be about 1 to 500 μm, preferably 2 to 100 μm, in view of usage of the battery (output-oriented, energy-oriented, etc.) and ion conductivity.

(Current Collector)

Each of the current collectors 11, 12 is formed from a conductive material. The size of the current collector is determined depending on usage of the battery. For example, in the case of the use in a large battery which is required to have high energy density, a current collector having a large area is used. The thickness of the current collector is not particularly limited. The thickness of the current collector may ordinarily be about 1 to 100 μm. The shape of the current collector is not particularly limited, either. In the laminated battery 10 shown in FIG. 1, a current collecting foil, a lattice form (e.g., expanded grid), or the like may be used. In the case of forming the thin film alloy of the negative electrode active material directly on the negative electrode current collector 12 by sputtering or the like, it is desirable to use the current collecting foil.

A material for forming the current collector is not particularly limited. For example, a metal or a resin obtained by adding a conductive filler to a conductive polymer material or a non-conductive polymer material may be used. More specifically, examples of the metal include aluminum, nickel, iron, stainless steel, titanium, and copper. As other examples, a clad material of nickel and aluminum, a clad material of copper and aluminum, a plating material of each of the combinations of metal, or the like may preferably be used. A foil obtained by coating a metal surface with aluminum may be used. Aluminum, stainless steel, copper, and nickel are especially preferred from the viewpoints of electron conductivity, battery operating potential, adhesion of negative electrode active material to current collector by sputtering, and the like.

Examples of the conductive polymer material include polyaniline, polypyrrole, polythiophene, polyacetylene, polyparaphenylene, polyphenylenevinylene, polyacrylonitrile, and polyoxadiazole. Since these conductive polymer materials have satisfactory conductivity without addition of the conductive filler, they are advantageous for facilitating the production process or attaining a lightweight current collector.

Examples of the non-conductive polymer material include polyethylene (PE: high density polyethylene (HDPE), low density polyethylene (LDPE) etc.), polypropylene (PP), polyethylene terephthalate (PET), polyethernitrile (PEN), polyimide (PI), polyamideimide (PAI), polyamide (PA), polytetrafluoroethylene (PTFE), a styrene-butadiene rubber (SBR), polyacrylonitrile (PAN), polymethylacrylate (PMA), polymethylmethacrylate (PMMA), polyvinyl chloride (PVC), polyvinylidene fluoride (PVdF), and polystyrene (PS). These non-conductive polymer materials have excellent potential resistance or solvent resistance.

A conductive filler may be added as required to the conductive polymer material or the non-conductive polymer material. Particularly, in the case where the resin as a base material of the current collector is formed only of the non-conductive polymer, the conductive filler is naturally essential for imparting conductivity to the resin. As the conductive filler, materials having conductivity are usable without particular limitation. For example, examples of a material which is excellent in conductivity, potential resistance, or lithium ion shielding property include a metal and conductive carbon. As the metal, at least one metal selected from the group consisting of Ni, Ti, Al, Cu, Pt, Fe, Cr, Sn, Zn, In, Sb, and K or an alloy or a metal oxide containing the metal may preferably be contained without particular limitation thereto. The conductive carbon is not particularly limited. The conductive carbon may preferably contain at least one kind selected from the group consisting of acetylene black, vulcan, black pearl, carbon nanofiber, ketjen black, carbon nanotube, carbon nanohorn, carbon nanobaloon, and fullerene. An amount of the conductive filler to be added is not particularly limited as long as the amount is capable of imparting satisfactory conductivity to the current collector and may ordinarily be about 5 to 35 mass %.

(Electrolyte Layer)

As an electrolyte to form the electrolyte layer 17, a liquid electrolyte or a polymer electrolyte may be used.

The liquid electrolyte has a form in which a lithium salt as a supporting salt is dissolved into an organic solvent which is a plasticizer. Examples of the organic solvent usable as the plasticizer include carbonates such as ethylene carbonate (EC), propylene carbonate (PC), diethyl carbonate (DEC), and dimethyl carbonate (DMC). Also, as the supporting salt (lithium salt), the compound which can be added to the active material layer of the electrode, such as LiBETI, is likewise usable.

The polymer electrolyte is classified into a gel electrolyte which contains an electrolyte solution and an intrinsic polymer electrolyte which does not contain any electrolyte solution.

The gel electrolyte has a structure in which the liquid electrolyte (electrolyte solution) is injected into a matrix polymer formed of an ion-conducting polymer. Examples of the ion-conducting polymer to be used as the matrix polymer include polyethylene oxide (PEO), polypropylene oxide (PPO), and copolymers thereof. The electrolyte salt such as the lithium salt is well dissolved into the polyalkylene oxide-based polymer.

A proportion of the liquid electrolyte (electrolyte solution) in the gel electrolyte is not particularly limited and may desirably be from several mass % to about 98 mass % from the viewpoints of ion conductivity and the like. In the present embodiment, the gel electrolyte containing a large amount of the electrolyte solution, i.e. having the electrolyte solution proportion of 70 mass % or more, is particularly effective.

In the case where the electrolyte layer is formed of the liquid electrolyte, the gel electrolyte, or the intrinsic polymer electrolyte, a separator may be provided in the electrolyte layer. Examples of a specific form of the separator (including non-woven cloth) include a microporous film or porous flat plate made from polyolefin such as polyethylene and polypropylene and a non-woven cloth.

The intrinsic polymer electrolyte has a structure in which the supporting salt (lithium salt) is dissolved into the matrix polymer and does not contain any organic solvent which is the plasticizer. Therefore, in the case where the electrolyte layer is formed from the intrinsic polymer electrolyte, the battery is free from liquid leakage and is improved in reliability.

The matrix polymer of the gel electrolyte and the intrinsic polymer electrolyte may exhibit excellent mechanical strength when a crosslinking structure is formed. It is possible to form the crosslinking structure by performing polymerization such as heat polymerization, UV polymerization, radiation polymerization, and electron beam polymerization using an appropriate polymerization initiator on a polymerizable polymer for polymer electrolyte formation (e.g. PEO or PPO).

(Current Collector Plate and Lead)

A current collector plate may be used for the purpose of withdrawing a current to the outside of the battery. The current collector plate is electrically connected to the current collector or a lead and withdrawn to the outside of the laminated sheet which is the battery jacket material.

A material for forming the current collector plate is not particularly limited, and a known high conductive material which has heretofore been used as the current collector plate of lithium ion secondary battery may be used. As the material forming the current collector plate, a metal material such as aluminum, copper, titanium, nickel, stainless steel (SUS), and alloys thereof are preferred, and aluminum and copper are more preferred from the viewpoints of lightweight, corrosion resistance, and high conductivity. An identical material or different materials may be used for the positive electrode current collector plate and the negative electrode current collector plate.

A positive terminal lead and a negative terminal lead are used as required. As a material for forming the positive terminal lead and the negative terminal lead, a terminal lead which is used in known lithium ion secondary batteries may be used. It is preferable to cover the portion withdrawn from the battery jacket material 29 with a heat insulating heat shrinkable tube or the like so as not to influence the product (e.g. automobile part, particularly, electronic appliance) by electric leakage due to contact with a peripheral device or wires.

(Battery Jacket Material)

As the battery jacket material 29, a known metal can casing may be used, and a sac-like casing which is capable of covering the power generation element and is made by using a laminated film containing aluminum is usable. As the laminated film, for example, a three-layer structure laminated film in which PP, aluminum, and nylon are laminated in this order may be used, but the laminated film is not limitative at all. From the viewpoints of excellence in attaining high output and cooling performance and suitability for use in batteries for large appliances such as EV and HEV, the laminated film is desirable.

It is possible to produce the above-described lithium ion secondary battery by a known production method.

<Appearance Structure of Lithium Ion Secondary Battery>

FIG. 2 is a perspective view showing an appearance of a laminated flat lithium ion secondary battery.

As shown in FIG. 2, the laminated flat lithium ion secondary battery 50 has a flat rectangular shape, and a positive electrode current collector plate 58 and a negative electrode current collector plate 59 for withdrawing electric power are led out from both sides of the battery 50. A power generation element 57 is enclosed by a battery jacket material 52 of the lithium ion secondary battery 50, and a periphery thereof is thermally fused. The power generation element 57 is tightly sealed with the positive electrode current collector plate 58 and the negative electrode current collector plate 59 being led to the outside. The power generation element 57 corresponds to the power generation element 21 of the lithium ion secondary battery 10 shown in FIG. 1 described above. The power generation element 57 is obtainable by layering a plurality of single cell layers (single cells) 19 each formed of the positive electrode (positive electrode active material layer) 13, the electrolyte layer 17, and the negative electrode (negative electrode active material layer) 15.

The lithium ion secondary battery is not limited to the laminated flat battery (laminated battery). A wound lithium ion battery may have a cylindrical shape (coin cell), a prismatic shape (prismatic battery), or a rectangular flat shape attained by deforming the cylindrical shape, or may be a cylinder-like battery without particular limitation. A laminated film or a conventional cylinder can (metal can) may be used as the jacket material for the cylinder shape and the prismatic shape without particular limitation. Preferably, the power generation element is jacketed with an aluminum laminated film. It is possible to attain lightweight by this mode.

The mode of leading out the positive electrode current collector plate 58 and the negative electrode current collector plate 59 shown in FIG. 2 is not particularly limited. The positive electrode current collector plate 58 and the negative electrode current collector plate 59 may be led out from an identical side, or a plurality of the positive electrode current collector plates 58 and a plurality of the negative electrode current collector plates 59 may be separately led out from each side without limitation to the one shown in FIG. 2. In the wound lithium ion battery, a terminal may be formed by using a cylinder can (metal can), for example, in place of the current collector plate.

As described above, the negative electrode and the lithium ion secondary battery using the negative electrode active material for lithium ion secondary battery of the present embodiment can be suitably used as a large capacity power source for an electric vehicle, a hybrid electric vehicle, a fuel cell vehicle, a hybrid fuel cell vehicle, and the like. In short, the negative electrode and the lithium ion secondary battery using the negative electrode active material for lithium ion secondary battery of the present embodiment can be suitably used for a power source for driving a vehicle and an auxiliary power source which are required to have high volumetric energy density and high volumetric output density.

The lithium ion battery is exemplified as the electric device in the present embodiment, but the present embodiment is not limited to the lithium ion battery and is applicable to secondary batteries of other types and, further, to primary batteries. Also, the present embodiment is applicable not only to the batteries but also to capacitors.

EXAMPLES

The present invention will be described in more details in conjunction with the following examples. It should be understood that the technical scope of the present invention is not limited to the following examples.

Example 1

Samples 1 to 48

1. Production of Cell for Evaluation (1) Production of Electrode for Evaluation

As electrodes for evaluation, thin film alloys obtained by sputtering and having various alloy compositions were used.

More specifically, as a sputtering apparatus, an independently controllable ternary DC magnetron sputtering apparatus (manufactured by Yamato-Kiki Industrial Co., Ltd.; combinatorial sputter coating apparatus; gun-sample distance: about 100 mm) was used. The thin film alloys (Samples 1 to 48) of various alloy compositions were obtained under the following sputtering conditions, target specs, and electrode sample specs.

(i) More specifically, the sputtering conditions areas follows.

1) Base pressure: up to $7\times10^{-6}$ Pa

2) Sputtering gas: Ar (99.9999% or more)

3) Sputtering gas introduction amount: 10 sccm

4) Sputtering pressure: 30 mTorr

5) DC power source: Si (185 W), Zn (30 to 90 W), Al (30 to 180 W)

6) Pre-sputtering time: 1 min.

7) Sputtering time: 10 min.

8) Substrate heating: room temperature (ii) The target specs are as follows (manufactured by Kojundo Chemical Lab. Co., Ltd.).

1) Si target (4N): diameter: 2 inches; thickness: 3 mm+a backing plate of oxygen-free copper, thickness: 2 mm 2) Zn target (4N): diameter: 2 inches; thickness: 5 mm 3) Al target (5N): diameter: 2 inches; thickness: 5 mm (iii) The electrode sample specs are as follows.

1) Substrate (current collector): Ni foil (thickness: 20 μm)

2) Sputtering film thickness: Si was always 100 nm, and film thicknesses of the additive elements (Zn and Al) were appropriately changed for each of sputtering power levels. More specifically, the DC power source was changed for each of the sputtering power levels so that the thickness was increased for each of concentrations of the additive elements (Zn and Al) along with an increase in each of the additive element concentrations.

3) Composition Ratios of Alloys (mass %): see Table 1 below.

More specifically, the various alloy samples 1 to 48 were obtained as the electrodes for evaluation by forming alloy thin films in an amorphous state on Ni substrates using the Si target, the Zn target, and the Al target, fixing the sputtering time, and changing the power levels of the DC power source within the above-specified ranges. As one example of the sample production, the thin film alloy having the alloy composition shown in Table 1 was obtained as Sample 6 by setting the DC power source 2 (Si target) to 185 W, the DC power source 1 (Zn target) to 70 W, and the DC power source 3 (Al target) to 50 W.

Analysis of the obtained alloy samples 1 to 48 was conducted by employing the analysis method and the analysis device described below.

1) Composition analysis: SEM/EDX analysis (JEOL Ltd.), EPMA analysis (JEOL Ltd.)

2) Film thickness measurement (for calculating sputtering rate): film thickness meter (Tokyo Instruments, Inc.)

3) Film state analysis: Raman spectroscopic analysis (Bruker Japan Co., Ltd.)

(2) Production of Cells for Evaluation (CR2032 Type Coin Cell)

Cells for evaluation were produced by using the electrodes for evaluation obtained in (1) described above with the following coin cell specs.

(i) The coin cell specs are as follows.

1) Counter electrode: Li foil (diameter: 15 mm; thickness: 200 μm; manufactured by Honjo Metal Co., Ltd.)

Also, as the counter electrode, a positive electrode slurry electrode (e.g., $LiCoO_2$, $LiNiO_2$, $LiMn_2O_4$, Li(Ni, Mn, Co)$O_2$, Li(Li, Ni, Mn, Co)$O_2$, $LiRO_2$—$LiMn_2O_4$ (R is a transition metal element such as Ni, Mn, and Co) may be used.

2) Coin cell: CR2032 type

3) Separator: Celgard 2400 (manufactured by Celgard, LLC.)

4) Electrolyte solution: 1M $LiPF_6$/EC+DEC (1:1 (volumetric ratio))

5) Electrode for evaluation: alloy samples 1 to 48 (see Table 1) obtained in (1).

The cells for evaluation (CR2032 type coin cells) were constructed by combining the electrodes for evaluation with the Li foil (counter electrode), the separator, and the electrolyte solution.

2. Charge-Discharge Test Conditions/Evaluation Method (1) Charge-Discharge Test Conditions (i) Charge-discharge test conditions for the cells for evaluation were as follows.

1) Charge-discharge tester: HJ0501SM8A (manufactured by Hokuto Denko Corporation)

2) Charge-discharge conditions: [during charging] 0.1 mA, 2 V→10 mV (constant current/constant voltage mode);

[during discharge] 0.1 mA, 10 mV→2 V (constant current mode)

3) Thermostat bath: PFU-3K (manufactured by ESPEC Corp.)

4) Evaluation temperature: 300K (27° C.)

Each of the cells for evaluation was charged at 0.1 mA from 2 V to 10 mV at the constant current/constant voltage mode during charging (Li intercalation to the cell for evaluation) by using the charge-discharge tester in the thermostat bath maintained to the evaluation temperature. After that, discharge at 0.1 mA from 10 mV to 2 V was conducted during discharge (Li release from the cell for evaluation) at the constant current mode. A charge-discharge test was conducted by setting the above-described charge-discharge cycle as one cycle under the same charge-discharge conditions from the initial cycle (1st cycle) to the 50th cycle.

(2) Evaluation Method

The charge-discharge capacity was calculated per alloy weight.

In the case of the long term cycle, since a electrolyte solution deterioration mode is included in the cycle property (the cycle property is improved by using a high-performance electrolyte solution), the data of the 50th cycle in which the components originated from the alloy are prominent were used. The obtained results are shown in Table 1 below.

TABLE 1-1

| | Composition | | | | 50th cycle | |
|---|---|---|---|---|---|---|
| Sample number | Si (Wt %) | Zn (Wt %) | Al (Wt %) | 1st cycle Discharge capacity (mAh/g) | Discharge capacity (mAh/g) | Discharge capacity maintenance ratio (%) |
| 1 | 73 | 25 | 2 | 2532 | 2252 | 89 |
| 2 | 60 | 20 | 20 | 2120 | 1898 | 90 |
| 3 | 50 | 17 | 32 | 1837 | 1654 | 90 |
| 4 | 43 | 56 | 1 | 1605 | 1372 | 85 |
| 5 | 38 | 49 | 13 | 1689 | 1523 | 90 |
| 6 | 30 | 69 | 1 | 1306 | 1162 | 89 |
| 7 | 28 | 63 | 9 | 1190 | 1079 | 91 |
| 8 | 26 | 58 | 16 | 1129 | 1054 | 93 |
| 9 | 44 | 15 | 41 | 1627 | 1517 | 93 |
| 10 | 39 | 13 | 48 | 1369 | 148 | 11 |
| 11 | 34 | 12 | 54 | 1268 | 71 | 6 |
| 12 | 31 | 40 | 29 | 1268 | 1223 | 96 |
| 13 | 28 | 37 | 35 | 1166 | 1104 | 95 |
| 14 | 26 | 34 | 40 | 1099 | 1055 | 96 |
| 15 | 24 | 54 | 22 | 896 | 616 | 69 |
| 16 | 22 | 50 | 28 | 824 | 297 | 36 |
| 17 | 21 | 47 | 32 | 871 | 306 | 35 |
| 18 | 34 | 44 | 22 | 1072 | 1016 | 95 |
| 19 | 78 | 19 | 2 | 2714 | 2414 | 89 |
| 20 | 53 | 13 | 34 | 1778 | 253 | 14 |
| 21 | 66 | 33 | 2 | 2458 | 2308 | 94 |

TABLE 1-1-continued

| | Composition | | | | 50th cycle | |
|---|---|---|---|---|---|---|
| Sample number | Si (Wt %) | Zn (Wt %) | Al (Wt %) | 1st cycle Discharge capacity (mAh/g) | Discharge capacity (mAh/g) | Discharge capacity maintenance ratio (%) |
| 22 | 55 | 27 | 18 | 2436 | 2198 | 90 |
| 23 | 56 | 42 | 2 | 2432 | 2177 | 90 |
| 24 | 48 | 36 | 16 | 2065 | 1872 | 91 |
| 25 | 42 | 31 | 27 | 1910 | 1806 | 95 |
| 26 | 46 | 11 | 43 | 1695 | 221 | 13 |
| 27 | 40 | 10 | 50 | 1419 | 154 | 11 |
| 28 | 36 | 9 | 56 | 1309 | 74 | 6 |
| 29 | 36 | 18 | 46 | 1509 | 1430 | 95 |
| 30 | 33 | 16 | 51 | 1389 | 1298 | 93 |
| 31 | 37 | 28 | 35 | 1404 | 1262 | 90 |
| 32 | 33 | 25 | 42 | 1244 | 1150 | 92 |
| 33 | 30 | 23 | 47 | 1274 | 1179 | 93 |
| 34 | 47 | 23 | 30 | 1479 | 1401 | 95 |
| 35 | 41 | 20 | 39 | 1335 | 1290 | 97 |

TABLE 1-2

| | Composition | | | | 50th cycle | |
|---|---|---|---|---|---|---|
| Sample number | Si (Wt %) | Zn (Wt %) | Al (Wt %) | 1st cycle Discharge capacity (mAh/g) | Discharge capacity (mAh/g) | Discharge capacity maintenance ratio (%) |
| 36 | 61 | 0 | 39 | 1747 | 1504 | 86 |
| 37 | 66 | 0 | 34 | 1901 | 1664 | 88 |
| 38 | 72 | 0 | 28 | 2119 | 1396 | 66 |
| 39 | 78 | 0 | 22 | 2471 | 1158 | 47 |
| 40 | 87 | 0 | 13 | 2805 | 797 | 28 |
| 41 | 97 | 0 | 3 | 3031 | 1046 | 35 |
| 42 | 100 | 0 | 0 | 3232 | 1529 | 47 |
| 43 | 90 | 10 | 0 | 3218 | 2628 | 82 |
| 44 | 77 | 23 | 0 | 2685 | 2199 | 82 |
| 45 | 68 | 32 | 0 | 2398 | 1963 | 82 |
| 46 | 60 | 40 | 0 | 2041 | 1694 | 83 |
| 47 | 54 | 46 | 0 | 1784 | 1485 | 83 |
| 48 | 49 | 51 | 0 | 1703 | 1272 | 75 |

(1) "Discharge capacity (mAh/g)" in Tables is per pure Si or alloy weight and indicates a capacity when Li reacts with the Si—Zn—Al alloy (Si—Al alloy, pure Si, or Si—Zn alloy). The term "initial capacity" used in the specification corresponds to "discharge capacity (mAh/g)" of the initial cycle (1st cycle).

(2) "Discharge capacity maintenance ratio (%)" Tables represents an index for "how much of the initial capacity is sustained". A calculation formula for the discharge capacity maintenance ratio (%) is as follows.

Calculation formula:discharge capacity at 50th cycle/maximum discharge capacity×100

The maximum discharge capacity is exhibited for the period from the initial cycle to 10th cycle, ordinarily from 5th to 10th cycles.

From the results of Table 1, it was confirmed that each of the cells of Samples 1 to 35, especially the samples within the composition ranges enclosed by the thick line in FIGS. 6 to 8 realized the significantly high capacity which is not realized by the existing carbon-based negative electrode active materials (carbon/graphite-based negative electrode materials) as the discharge capacity at 1st cycle. Likewise, it was confirmed that the capacity (initial capacity of 1072 mAh/g or more)

which is higher than those of the existing high capacity Sn-based alloy negative electrode active materials was attained. Further, as to the cycle durability which has the trade-off relationship with the high capacity, it was confirmed that it is possible to realize the significantly excellent cycle durability as compared to the existing Sn-based negative electrode active materials which attain the high capacity but are inferior in cycle durability and the multi-element alloy negative electrode active materials disclosed in Patent Document 1. More specifically, it was confirmed that it is possible to realize the significantly excellent cycle durability which is indicated by the high discharge capacity maintenance ratio at 50th cycle of 85% or more, preferably 90% or more, or more preferably 95% or more. In view of the above, it was revealed that, since the samples within the composition ranges enclosed by the thick line in FIGS. 6 to 8 among the samples 1 to 35 had the high discharge capacity maintenance ratio as compared to other samples, the samples more effectively maintained the high capacity by suppressing the reduction of the high initial capacity.

From the results of the present example, it was revealed that, selections of the first additive element Zn which suppresses the amorphous-crystal phase transition in the alloying with Li and improves the cycle life and the second additive element Al which does not reduce the capacity as the electrode even when the first additive element concentration is increased are considerably useful and effective. By the selections of the first and second additive elements, it is possible to provide the Si alloy-based negative electrode active material having the high capacity and high cycle durability. As a result, it was revealed that it is possible to provide the lithium ion secondary battery having the high capacity and good cycle durability. Also, it was revealed that a cell having both of the high capacity and the cycle durability, which have the trade-off relationship, in a well-balanced manner was not obtained from the metal Si or the binary alloys of Samples 36 to 48.

Example 2

The initial cycle of each of the cells for evaluation (CR2032 type coin cells) using the electrodes for evaluation of Samples 14 and 42 was conducted under the same charge-discharge conditions as those of Example 1. A dQ/dV curve relative to a voltage (V) during discharge of the initial cycle is shown in FIG. 9.

Figure 9:
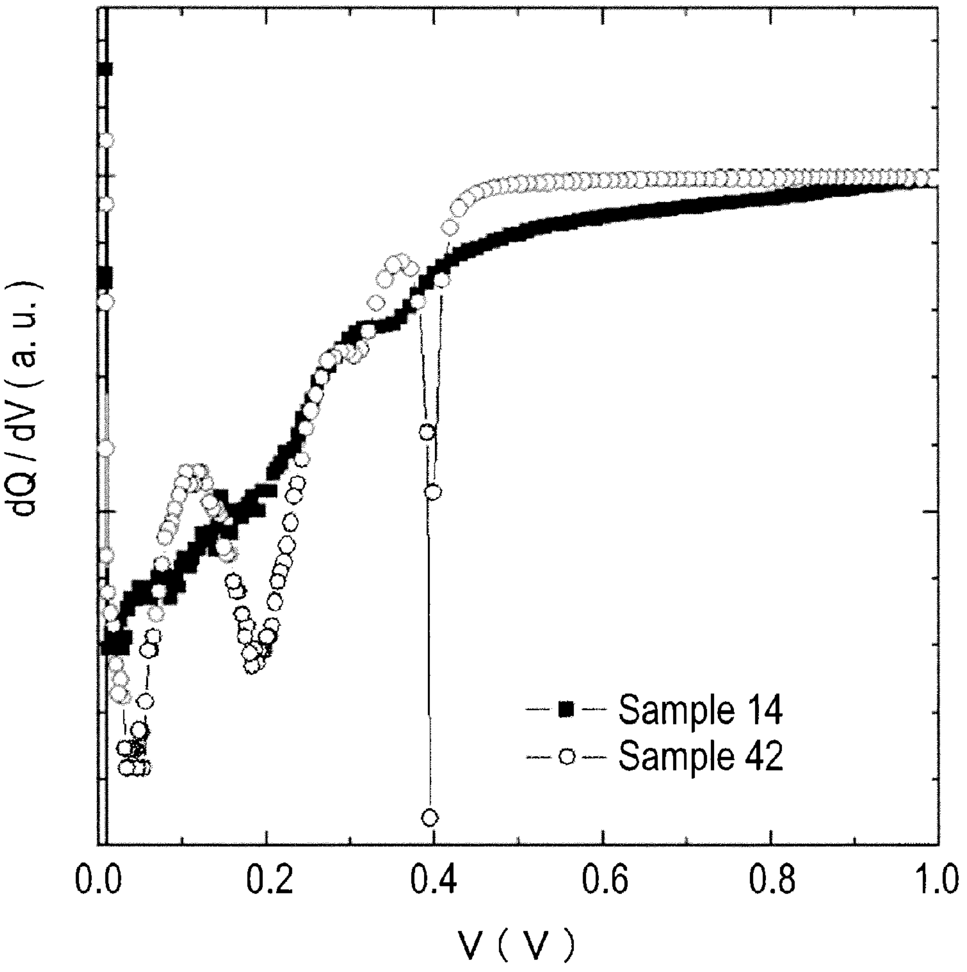
FIG. 9 is a diagram showing a dQ/dV curve during discharge at 1st cycle (initial cycle) of each of cells using samples of pure Si (sample 42) and a Si—Zn—Al ternary alloy (Sample 14) of Example 2.

As an interpretation of dQ/dV of Sample 14 based on FIG. 9, it was confirmed that crystallization of the Li—Si alloy was suppressed by adding the elements (Zn and Al) in addition to Si since the curve was gentle due to a reduction in number of downwardly projecting peaks in a region of low potential (0.4 V or less). Also, it was confirmed that decomposition of electrolyte solution was suppressed (near about 0.4 V). As used herein, Q represents a cell capacity (discharge capacity).

More specifically, the downwardly projecting sharp peak indicates a change caused by decomposition of the electrolyte solution in the vicinity of 0.4 V of Sample 42 (pure Si metal thin film). Also, each of the downwardly projecting gentle peaks in the vicinity of 0.35 V, 0.2 V, and 0.05 V indicates a change from the amorphous state to the crystal state.

In contrast, since the downwardly projecting sharp peak which indicates the change caused by decomposition of the electrolyte solution was not confirmed in Sample 14 (Si—Zn—Al ternary alloy thin film) to which the elements (Zn and Al) were added in addition to Si, it was confirmed that decomposition of electrolyte solution was suppressed (near about 0.4 V). Also, it was confirmed from the dQ/dV curve of Sample 6 that the crystallization of Li—Si alloy was suppressed since the curve was gentle and free from the downwardly projecting gentle peak which indicates the change from the amorphous state to the crystal state.

Example 3

Figure 10:
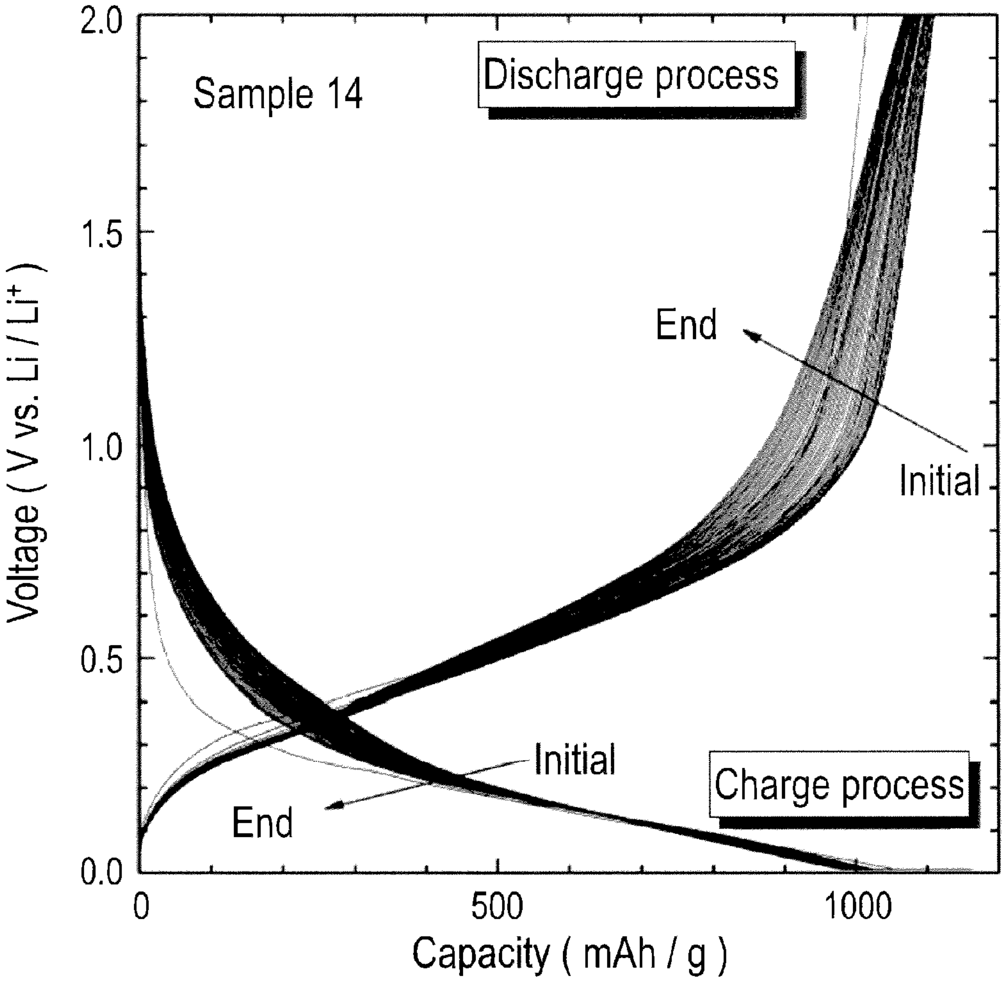
FIG. 10 is a diagram showing a charge-discharge curve including charging curves showing the course of charging to the 50th cycle and discharge curves showing the course of discharging of a cell (CR2032 type coin cell) for evaluation using an electrode for evaluation of the Si—Zn—Al ternary alloy (Sample 14), the charging and discharging being conducted in Example C. The arrow from "initial" to "end" in the figure indicates a direction of a shift of the charge-discharge cycle curve from the 1st (initial) cycle to the 50th (end) cycle.

A cell for evaluation (CR2032 type coin cell) using the electrode for evaluation of Sample 14 was subjected to the initial to 50th cycles under the charge-discharge conditions same as those of Example 1. The charge-discharge curves from the initial cycle to the 50th cycle are shown in FIG. 10. The charging in FIG. 10 indicates states of the charging curves in the cycles caused by the Li reaction (lithiation) in the electrode for evaluation of Sample 14. The discharging indicates states of the discharging curves of the cycles caused by Li release (delithiation).

In FIG. 10, the dense curve in each of the cycles indicates the suppressed cycle deterioration. The small kink (turn or twist) indicates that the amorphous state is maintained. Further, the small capacity difference between the charging and the discharging indicates the good charge-discharge efficiency.

From the above-described test results, it is possible to assume (estimate) the mechanism (functional mechanism) which enables the ternary alloys of the present embodiments to exhibit the well-balanced property of maintaining the high cycle property (particularly, the high discharge capacity maintenance ratios at 50th cycle) and attaining the high discharge capacity at 1st cycle as follows.

1. As described in Example 2, in view of the dQ/dV curve of the ternary alloys, the peaks in the low potential region (up to 0.6 V) are smaller in number and gentler than those of pure-Si which is not an alloy. This means that the decomposition of electrolyte solution is suppressed, and that the phase transition of Li—Si alloy to the crystal phase is suppressed (see FIG. 9).

2. It is revealed that the decomposition of electrolyte solution causes the discharge capacity to be reduced along with the increase in number of cycles in each of all Samples 1 to 25 (see Table 1). However, in the case of comparison among the discharge capacity maintenance ratios, it is revealed that the discharge capacity maintenance ratio of each of the ternary alloys is significantly higher than that of pure-Si of Sample 42 which is not an alloy. It is revealed that the high discharge capacity maintenance ratio is realized as compared to the exiting high capacity Sn-based negative electrode active materials, the multi-element alloy negative electrode active materials disclosed in Patent Document 1, and the binary alloy negative electrode active materials for reference. As a result, it is revealed that the cycle property tends to improve by the realization of the state in which the discharge capacity maintenance ratio is high (see the discharge capacity maintenance ratios at 50th cycle of Table 1).

3. When the phase transition of Li—Si alloy to the crystal phase occurs, the volumetric change of the active material is increased. By the phase transition and the volumetric change, a progression to destruction of the active material itself and then to destruction of the electrode is caused. In view of the dQ/dV curve of FIG. 9 of Example 2, it is determined that the phase transition is suppressed in Sample 14 of the present embodiment since the curve is gentle with the few phase transition-associated peaks.

| Reference Signs List | |
|---|---|
| 10, 50: | lithium ion secondary battery |
| 11: | positive electrode current collector |
| 12: | negative electrode current collector |
| 13: | positive electrode active material layer |
| 15: | negative electrode active material layer |
| 17: | electrolyte layer |
| 19: | single cell layer |
| 21, 57: | power generation element |
| 25, 58: | positive electrode current collector plate |
| 27, 59: | negative electrode current collector plate |
| 29, 52: | battery jacket material (laminated film) |

The invention claimed is:

1. A negative electrode for an electric device, comprising a negative electrode active material which comprises an alloy having a composition formula $Si_xZn_yAl_z$, where x+y+z=100, 26≤x≤47, 18≤y≤44, and 22≤z≤46, where each of x, y, and z represents a mass percent value.

2. An electric device comprising the negative electrode according to claim 1.

3. The electric device according to claim 2, which is a lithium ion secondary battery.

* * * * *